United States Patent
Ichijo et al.

(10) Patent No.: US 9,699,185 B2
(45) Date of Patent: Jul. 4, 2017

(54) UNAUTHORIZED DEVICE DETECTION METHOD, UNAUTHORIZED DEVICE DETECTION SERVER, AND UNAUTHORIZED DEVICE DETECTION SYSTEM

(71) Applicant: Panasonic Intellectual Property Management Co., Ltd., Osaka (JP)

(72) Inventors: Ayaka Ichijo, Osaka (JP); Motoji Ohmori, Osaka (JP); Manabu Maeda, Osaka (JP); Yuji Unagami, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/604,964

(22) Filed: Jan. 26, 2015

(65) Prior Publication Data
US 2015/0222632 A1    Aug. 6, 2015

Related U.S. Application Data

(60) Provisional application No. 61/933,934, filed on Jan. 31, 2014.

(30) Foreign Application Priority Data

Sep. 1, 2014   (JP) .................. 2014-177038

(51) Int. Cl.
G06F 7/04     (2006.01)
H04L 29/06    (2006.01)
(Continued)

(52) U.S. Cl.
CPC .......... *H04L 63/0876* (2013.01); *G06F 21/30* (2013.01); *G06F 21/44* (2013.01); *H04W 12/06* (2013.01)

(58) Field of Classification Search
CPC .................................. H04L 63/0876
(Continued)

(56) References Cited

U.S. PATENT DOCUMENTS 8,302,152 B1 * 10/2012 Hewinson ............... H04L 63/10
455/410
8,943,566 B2 * 1/2015 DeLuca .................. H04W 4/04
726/7
(Continued)

FOREIGN PATENT DOCUMENTS

WO    2006/064768    6/2006

OTHER PUBLICATIONS

"Wi-Fi CERTIFIED Wi-Fi Protected Setup" Wi-Fi Alliance, Dec. 2010.
(Continued)

*Primary Examiner* — Peter Shaw
(74) *Attorney, Agent, or Firm* — Greenblum & Bernstein, P.L.C.

(57) ABSTRACT

A server holds correspondence information in which a device identifier of a device for which an authentication process is successful and area network information concerning an area network including a controller are associated with each other. In the case where the authentication process is successful, the device holds area network information concerning an area network including a controller for which authentication is successful. In response to a connection request from a new device, the server checks whether an identifier of the new device is registered in the correspondence information. If the identifier is registered, the server determines whether the area network information associated with the identifier matches the area network information
(Continued)

held by the new device. If the pieces of information do not match, the server detects the new device as an unauthorized device.

9 Claims, 15 Drawing Sheets

(51) Int. Cl.
    *G06F 21/30*     (2013.01)
    *H04W 12/06*     (2009.01)
    *G06F 21/44*     (2013.01)

(58) Field of Classification Search
    USPC .......................................................... 726/7
    See application file for complete search history.

(56) References Cited

U.S. PATENT DOCUMENTS

2007/0283162 A1    12/2007    Nonaka et al.
2012/0135711 A1*    5/2012    Jabara ................. H04L 63/0876
    455/411
2012/0203906 A1*    8/2012    Jaudon ................. H04W 76/04
    709/225

OTHER PUBLICATIONS

Atsuko Miyaji et al. "Information Security" Ohm-sha pp. 140-147, Oct. 25, 2003.

"Suite B Implementer's Guide to FIPS 186-3 (ECDSA)" Feb. 3, 2010.

Elaine Barker et al., "Recommendation for Pair-Wise Key Establishment Schemes Using Discrete Logarithm Cryptography" NIST Special Publication 800-56A Revision 2.

D. Forsberg et al., "Protocol for Carrying Authentication for Network Access (PANA)", RFC5191, May 2008.

* cited by examiner

FIG. 17

| CONTROLLER ID | CERTIFICATE ID | OTHER DEVICE ID |
|---|---|---|
| 100a | 100a_is0101 | 200b, 200c, 200d |

FIG. 18

| DEVICE ID | CONTROLLER ID | OTHER DEVICE ID |
|---|---|---|
| 200a | 100a | 200b, 200c, 200d |
| 200b | 100a | 200a, 200c, 200d |
| 200c | 100a | 200a, 200b, 200c |
| 200d | 100b | 200e |
| ⋮ | ⋮ | ⋮ |

FIG. 19

| CONTROLLER ID | CONTROLLER CERTIFICATE ID | DEVICE TYPE ID | DEVICE ID |
|---|---|---|---|
| 100a | 100a_is0101 | XL-236-7D | 200b |
| | | CPS077 | 200c |
| | | CPS079 | 200d |

UNAUTHORIZED DEVICE DETECTION METHOD, UNAUTHORIZED DEVICE DETECTION SERVER, AND UNAUTHORIZED DEVICE DETECTION SYSTEM

CROSS REFERENCES TO RELATED APPLICATIONS

This application claims priority to U.S. Provisional Application No. 61/933,934 filed on Jan. 31, 2014, and Japanese Patent Application No. 2014-177038 filed on Sep. 1, 2014, the contents of each of which are hereby incorporated by reference.

BACKGROUND

1. Technical Field

The present disclosure relates to an unauthorized device detection method employed in a system including a plurality of devices connected to one another.

2. Description of the Related Art

In recent years, household electrical appliances and audio-visual appliances installed in a home have come to be connected to a network, and various services using various kinds of history information collected from these appliances to the cloud are expected.

In such a case, a controller is installed in the home and relays transmission of history information from each household electrical appliance to a manufacturer server. At this time, authentication is performed to enable secure communication between the controller and the household electrical appliance. This approach is an attempt to prevent information leakage during wireless communication and a spoofing connection to the home network, for example.

Given this situation, the Wi-Fi Alliance has developed a standard called "Wi-Fi Protected Setup" which makes it easier to establish a connection between devices (for example, "Wi-Fi CERTIFIED Wi-Fi Protected Setup"). However, Wi-Fi wireless connection ensures only the interconnectability between a household electrical appliance and an access point device serving as the controller and does not ensure that a connection counterpart is an authorized device. However, it is known that a public key infrastructure (PKI) is usable as a method for verifying the authenticity of devices (for example, Atsuko Miyaji and Hiroaki Kikuchi "Information Security" (2003)).

In the case where leakage of a secret key has occurred in PKI-based authentication, a public key certificate needs to be revoked in order to prevent unauthorized activity using the public key certificate. A typical method used to revoke a public key certificate is a certificate revocation list (CRL) (for example, Atsuko Miyaji and Hiroaki Kikuchi "Information Security" (2003)).

The CRL is a list of revoked public key certificates. In general, the certificate authority that has issued public key certificates distributes the CRL after attaching its signature to the IDs of the revoked public key certificates. An entity such as a household electrical appliance or a controller determines whether or not a public key certificate for a connection counterpart entity is listed in the CRL. For this reason, the latest CRL needs to be used.

In addition, in the case where there are a plurality of unauthorized devices having the same identifier as a result of copying information held by one device to another device, it is necessary to detect the plurality of unauthorized devices and cause the detection result to be reflected in the CRL. Accordingly, in order to detect a plurality of unauthorized devices having the same identifier in a case where there are such unauthorized devices, a method in which a random number used in mutual authentication is stored after the mutual authentication and the stored random number is used to check a counterpart in the following authentication (for example, Japanese Patent No. 04857123) has been proposed.

Techniques used in the related art are also described in "NSA Suite B Implementer's Guide to FIPS 186-3 (ECDSA)", "NIST Special Publication 800-56A Revision 2", and "RFC5191 Protocol for Carrying Authentication for Network Access (PANA)", for example.

SUMMARY

It is generally desirable to minimize a storage capacity of a memory of a household electrical appliance in order to reduce the cost. Thus, there is a request to avoid, if possible, storing random numbers in a household electrical appliance using the method described in Japanese Patent No. 04857123.

Thus, a non-limiting exemplary embodiment of the present disclosure provides an unauthorized device detection method that enables a device having a copy of data necessary for authentication to be detected as an unauthorized device without requiring storage of extra information in a device.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

In one general aspect, the techniques disclosed herein feature an unauthorized device detection method employed in an unauthorized device detection system, the unauthorized device detection system including a plurality of area networks and an unauthorized device detection server, each of the plurality of area networks including at least one controller and one or more devices connected to the controller, the unauthorized device detection server holding correspondence information in which, for each of the plurality of area networks, area network information concerning the area network is associated with one or more device identifiers indicating one or more devices for which an authentication process has been successful among the one or more devices included in the area network, the unauthorized device detection method including: causing, in a case where an authentication process performed between a device among the one or more devices and the controller is successful, the device to hold the area network information concerning the area network including the controller for which the authentication process is successful; causing, in a case where there is a device for which authentication is newly performed between the device and a controller among the controllers, the unauthorized device detection server to obtain a device identifier of the device for which authentication is newly performed; causing the unauthorized device detection server to check whether or not the device identifier that has been obtained is contained in the correspondence information; causing the unauthorized device detection server to attempt to obtain the area network information from the device for which authentication is newly performed, in a case where the device identifier that has been obtained is contained in the correspondence information; causing, in a case where the area network information has been successfully obtained from the device for which authentication is newly performed, the unauthorized device detection server to determine whether or not the area network information that has been obtained matches the area network information associated in the correspondence information with the device identifier of the device for which authentication is newly performed; and causing the unauthorized device detection server to detect the device for which authentication is newly performed as an unauthorized device, in a case where it is determined that the area network information that has been obtained does not match the area network information associated in the correspondence information with the device identifier of the device for which authentication is newly performed.

The configuration described above enables an unauthorized device to be detected when a connection is established between a controller and a device if area network information held by the device does not match area network information held by a server in association with the device. Consequently, an unauthorized device can be prevented from joining an area network.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

BRIEF DESCRIPTION OF THE DRAWINGS

FIG. 17 is a conceptual data diagram illustrating a structure of the controller information held by the device in accordance with a modification;

FIG. 18 is a conceptual data diagram illustrating a structure of the correspondence information held by the manufacturer server in accordance with a modification; and FIG. 19 is a conceptual data diagram illustrating another structure of the controller information held by the device in accordance with a modification.

DETAILED DESCRIPTION

An unauthorized device detection system according to an embodiment of the present disclosure will be described with reference to the accompanying drawings.

Embodiment

Configuration

Figure 1:
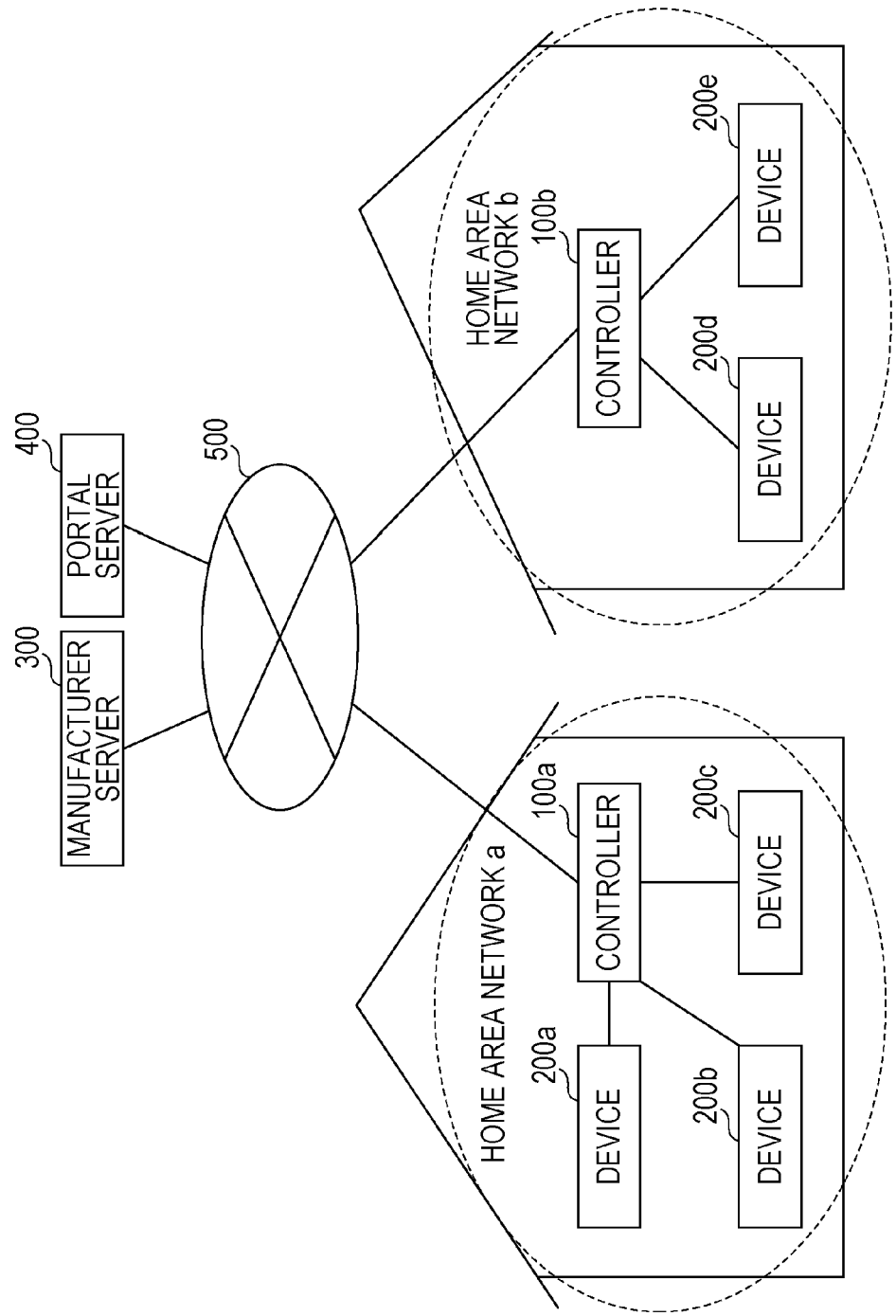
FIG. 1 is a diagram illustrating a system configuration of an unauthorized device detection system.

FIG. 1 is a diagram illustrating a system configuration of the unauthorized device detection system. As illustrated in FIG. 1, the unauthorized device detection system includes a plurality of area networks (i.e., home area networks a and b), a manufacturer server 300, and a portal server 400 which are connected to one another via a network 500. Ranges enclosed by dashed lines in FIG. 1 correspond to approximate ranges of the home area networks a and b.

Each of the home area networks a and b includes at least one controller to which one or more devices are connected. Herein, the term "device" refers to a general household electrical appliance (e.g., a television, a refrigerator, a microwave oven, or an air conditioner).

In the example illustrated in FIG. 1, the home area network a includes a controller 100a and devices 200a, 200b, and 200c. The devices 200a, 200b, and 200c are connected to the controller 100a. The controller 100a is connected to the network 500.

The home area network b includes a controller 100b and devices 200d and 200e. The devices 200d and 200e are connected to the controller 100b. The controller 100b is connected to the network 500.

The controllers 100a and 100b are connected to the manufacturer server 300 via the network 500.

In this embodiment, the manufacturer server 300 holds correspondence information which represents a correspondence between a device and a controller between which a connection has been established. When newly performing a connection setup for a device and a controller, the manufacturer server 300 determines whether or not the device subjected to authentication is already associated with the controller in the correspondence information. If the device is associated with the controller, the manufacturer server 300 determines whether or not the device is an unauthorized device depending on whether or not the device holds information concerning the associated controller as area network information.

Each of the controllers 100a and 100b (which may be collectively referred to as "controllers 100" if distinction between them is not required), the devices 200a to 200e (which may be collectively referred to as "devices 200" if distinction between them is not required), the manufacturer server 300, and the portal server 400 included in the unauthorized device detection system will be described in detail below.

Configuration of Controller

Figure 2:
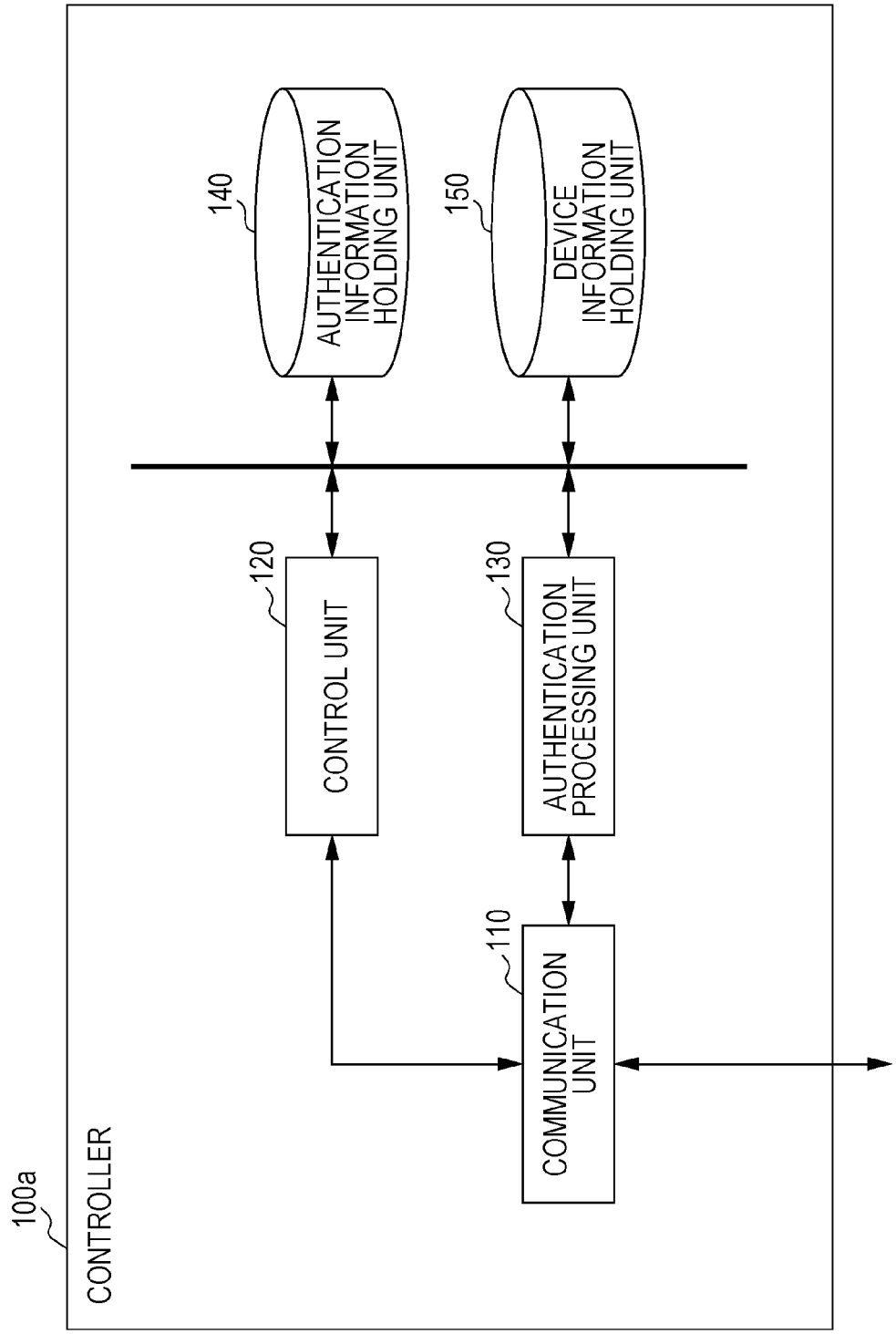
FIG. 2 is a block diagram illustrating a functional configuration of a controller.

FIG. 2 is a block diagram illustrating a functional configuration of the controllers 100a and 100b. The controllers 100a and 100b have similar configurations except for devices connected to thereto, and thus the controller 100a will be described.

As illustrated in FIG. 2, the controller 100a includes a communication unit 110, a control unit 120, an authentication processing unit 130, an authentication information holding unit 140, and a device information holding unit 150.

The communication unit 110 has a function for performing communication with a device connected to the controller 100a and with the manufacturer server 300 and the portal server 400 via the network 500.

The control unit 120 controls individual components of the controller 100a and has a function for managing devices connected to the controller 100a. Upon receipt of a connection request from a device via the communication unit 110, the control unit 120 transfers a public key certificate to the authentication processing unit 130 to request the authentication processing unit 130 to perform an authentication process. Upon receipt of a notification indicating that authentication of the transferred public key certificate is successful from the authentication processing unit 130, the control unit 120 transmits to the manufacturer server 300 a check request to check whether or not a device ID of the device that has transmitted the connection request is registered. Upon receipt of a connected controller ID request for a controller ID held by the device from the manufacturer server 300, the control unit 120 transfers the connected controller ID request to the device. In addition, upon receipt of the controller ID held by the device and transmitted from the device in response to the transferred connected controller ID request, the control unit 120 transfers the controller ID to the manufacturer server 300. Upon receipt of an authentication discontinuation notification from the manufacturer server 300, the control unit 120 notifies the authentication processing unit 130 to discontinue the authentication process, and transmits an error notification to the device that has transmitted the connection request. Upon receipt of an authentication continuation notification from the manufacturer server 300, the control unit 120 notifies the authentication processing unit 130 to continue the authentication process.

The control unit 120 then receives the authentication result from the authentication processing unit 130. In the case where the received authentication result indicates that authentication is successful, the control unit 120 stores the device ID of the device that has been successfully authenticated and the ID of the public key certificate held by the device in association with each other in device information held by the device information holding unit 150.

The authentication processing unit 130 has a function for performing an authentication process for a device that has transmitted a connection request. In response to an authentication request from the control unit 120, the authentication processing unit 130 performs an authentication process on a public key certificate transferred thereto along with the authentication request. Upon receipt of an authentication request from the control unit 120, the authentication processing unit 130 accesses the authentication information holding unit 140 and obtains a CRL. The authentication processing unit 130 determines whether or not the ID of the public key certificate transferred from the control unit 120 is registered in the obtained CRL. The authentication processing unit 130 performs authentication on a signature of the public key certificate by using a public key of the portal server 400. If the ID of the public key certificate is not registered in the CRL and verification of the signature of the public key certificate is successful, the authentication processing unit 130 notifies the control unit 120 that verification of the public key certificate is successful. If the ID of the public key certificate is registered in the CRL or if verification of the signature of the public key certificate is unsuccessful, the authentication processing unit 130 notifies the control unit 120 that authentication of the public key certificate is unsuccessful.

Upon receipt of an authentication continuation notification from the control unit 120, the authentication processing unit 130 generates a random number and transmits the random number to the device via the communication unit 110. In addition, upon receipt of a random number from the device via the communication unit 110, the authentication processing unit 130 performs verification on a signature of the received random number. If the verification is unsuccessful, the authentication processing unit 130 determines that the device that has made the connection request is an unauthorized device. Then, the authentication processing unit 130 notifies the control unit 120 of the result of authentication.

The authentication information holding unit 140 is a database that holds a key pair of a secret key and a public key certificate and information concerning the CRL used in authentication. Specifically, the authentication information holding unit 140 is implemented by a recording medium, such as a flash memory, a hard disk drive (HDD), or a solid state drive (SSD). Details about the public key certificate and the CRL will be described later.

The device information holding unit 150 is a database that holds device information used for managing devices that have been connected to the controller 100a and successfully authenticated. Specifically, the device information holding unit 150 is implemented by a recording medium, such as a flash memory, an HDD, or an SSD. Details about the device information will be described later.

Note that the authentication information holding unit 140 and the device information holding unit 150 may be implemented by separate recording media or by separate storage areas in a single recording medium.

The controller 100a has the above-described configuration.

Configuration of Device

Figure 3:
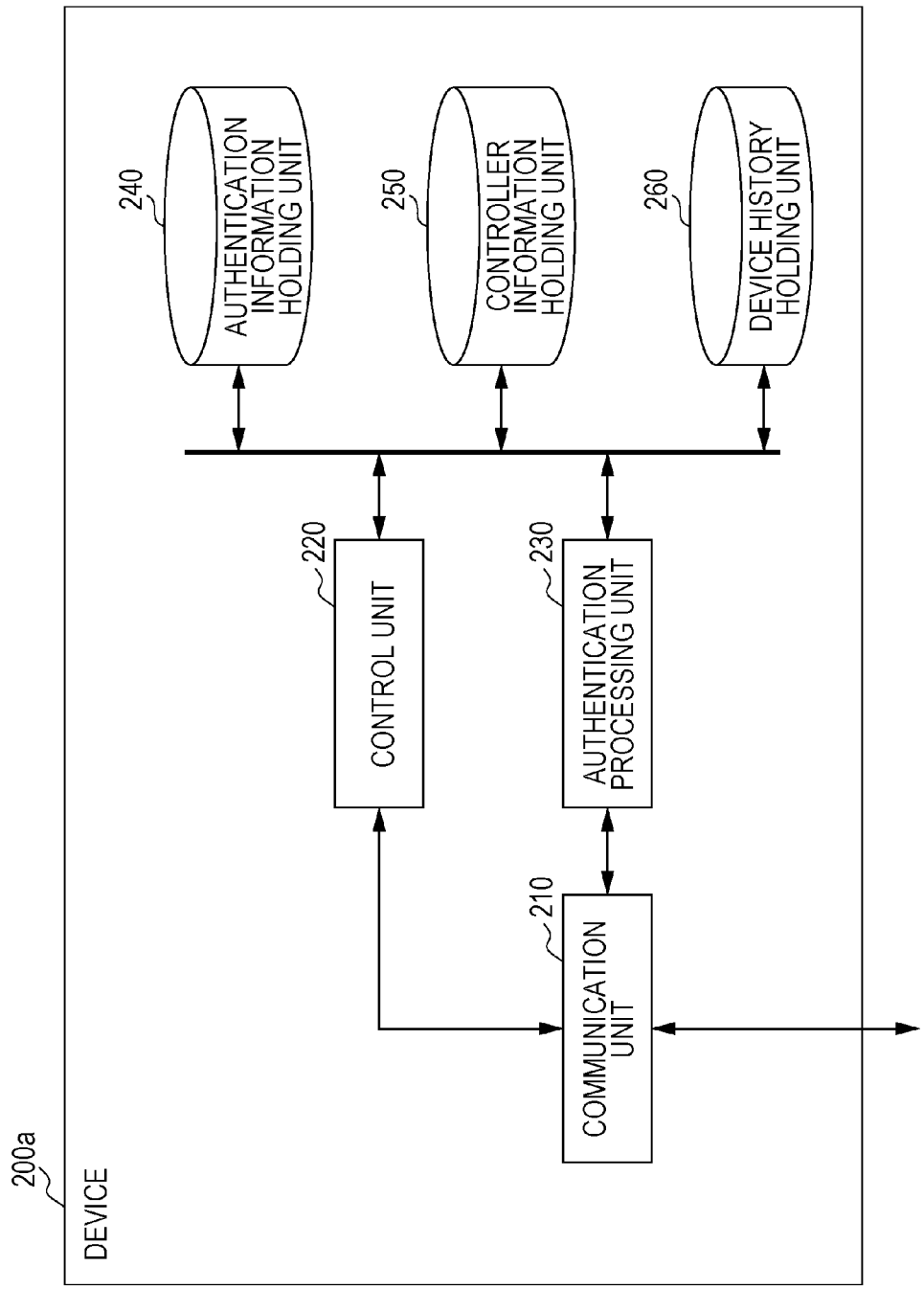
FIG. 3 is a block diagram illustrating a functional configuration of a device.

FIG. 3 is a block diagram illustrating a functional configuration of the devices 200a to 200e. Because the devices 200a to 200e have similar configurations, a description will be given of the device 200a here. Note that the devices 200a to 200e have unique functions which are not shared among the devices 200a to 200e if the devices 200a to 200e are of different types. The unique functions may be, for example, a washing function if the device is a washing machine or an air cooling and heating function if the device is an air conditioner. Because the unique functions are general functions, a description regarding the unique functions will be omitted here and a function related to detection of an unauthorized device alone will be described.

As illustrated in FIG. 3, the device 200a includes a communication unit 210, a control unit 220, an authentication processing unit 230, an authentication information holding unit 240, a controller information holding unit 250, and a device history holding unit 260.

The communication unit 210 has a function for performing communication with a controller 100 connected to the device 200a.

The control unit 220 has a function for controlling individual components of the device 200a. The control unit 220 transmits a connection request to the controller 100 connected to the device 200a via the communication unit 210.

Upon receipt of a connected controller ID request for a connected controller ID which serves as area network information from the manufacturer server 300 via the connected controller 100 and the communication unit 210, the control unit 220 obtains a controller ID stored in the controller information holding unit 250 and transmits the controller ID to the manufacturer server 300. If the control unit 220 fails to obtain the controller ID at this time, the control unit 220 transmits information indicating that no controller ID is held to the manufacturer server 300.

In addition, upon receipt of information such as a controller ID, a public key certificate, and a random number from the connected controller 100, the control unit 220 requests the authentication processing unit 230 to perform an authentication process for the controller 100.

Upon receipt of information indicating authentication is successful from the authentication processing unit 230 in response to the request, the control unit 220 adds a pair of the controller ID of the connected controller 100 and the certificate ID of the public key certificate owned by the controller 100 to the controller information, and terminates the authentication process. Upon receipt of information indicating that authentication is unsuccessful from the authentication processing unit 230 in response to the request, the control unit 220 determines that the controller 100 serving as the connection destination is an unauthorized controller, and terminates the connection process.

In addition, upon receipt of an error from the controller 100 via the communication unit 210 during the authentication process, the control unit 220 recognizes that authentication is unsuccessful, and terminates the authentication process.

The authentication processing unit 230 has a function for performing an authentication process for the connected controller 100 via the communication unit 210. Upon receipt of an authentication request containing the controller ID, the public key certificate, and the random number of the controller 100 from the control unit 220, the authentication processing unit 230 accesses the authentication information holding unit 240 and obtains the CRL. The authentication processing unit 230 then determines whether or not the certificate ID of the received public key certificate is registered in the obtained CRL. The authentication processing unit 230 also performs verification on the signature of the public key certificate by using the public key of the portal server 400 which serves as a certificate authority. If verification of the signature of the public key certificate is successful, the authentication processing unit 230 generates a random number, and transmits the generated random number to the controller 100 via the communication unit 210. The authentication processing unit 230 also performs verification on a signature attached to the random number received from the controller 100. If verification on the signature of the public key certificate or verification on the signature of the random number has failed, the authentication processing unit 230 notifies the control unit 220 that authentication is unsuccessful. If the authentication is successful, the authentication processing unit 230 notifies the control unit 220 that authentication is successful.

The authentication information holding unit 240 is a database that holds a key pair of a secret key and a public key certificate and information concerning the CRL used in authentication. Details about the public key certificate and the CRL will be described later.

The controller information holding unit 250 has a function for holding controller information concerning a controller which has been connected to the device 200a and successfully authenticated. Details about the controller information will be described later.

The device history holding unit 260 is a database that holds operation history information of the device 200a. Specifically, the device history holding unit 260 is implemented by a recording medium, such as a flash memory, an HDD, or an SSD. The operation history information represents a general operation history, and thus a description of details thereof will be omitted. To put it briefly, the operation history information is, for example, information in which a function of the device that has been executed and an execution date and time are associated with the execution result.

Manufacturer Server 300

Figure 4:
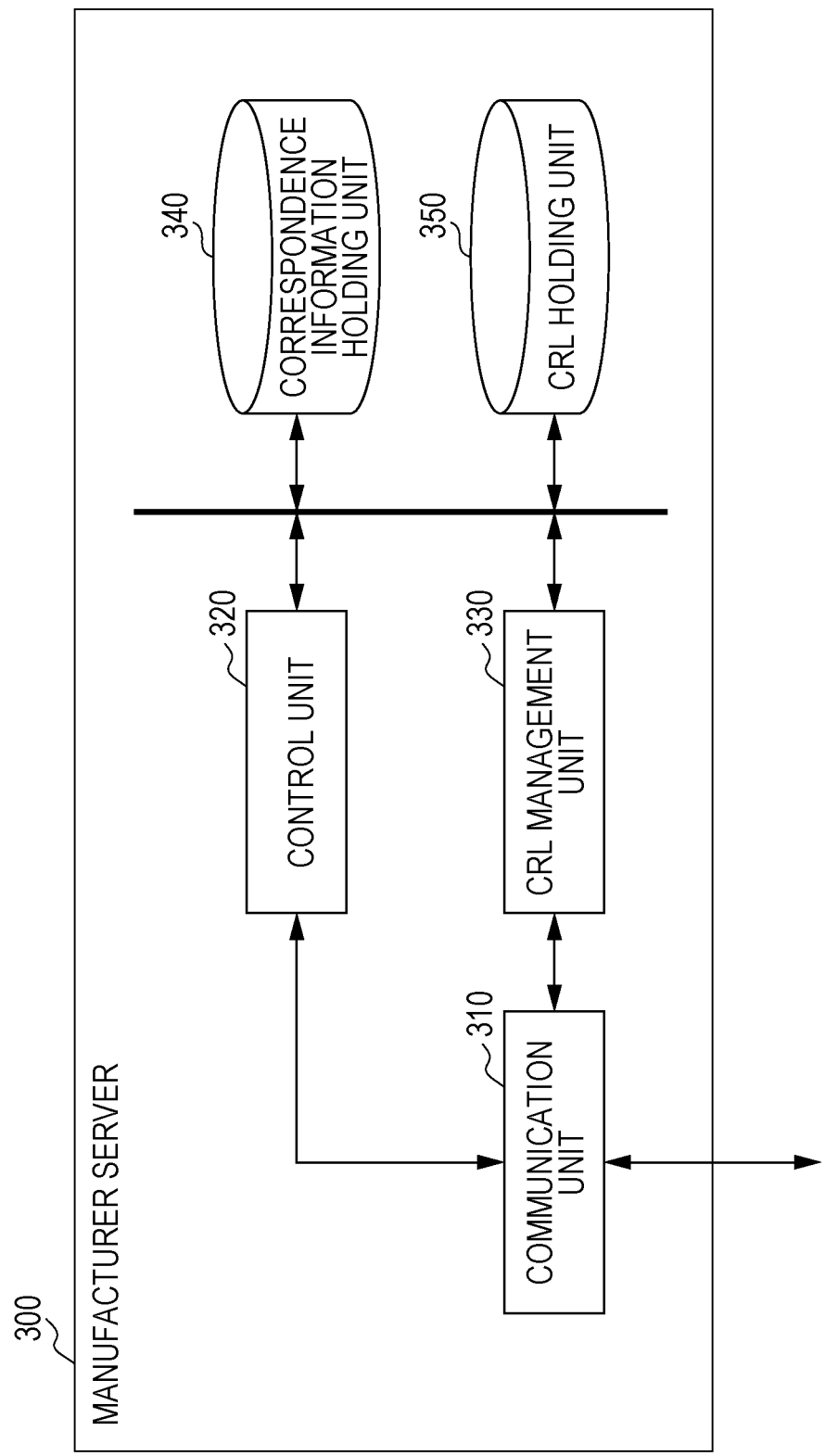
FIG. 4 is a block diagram illustrating a functional configuration of a manufacturer server.

FIG. 4 is a block diagram illustrating a functional configuration of the manufacturer server 300. As illustrated in FIG. 4, the manufacturer server 300 includes a communication unit 310, a control unit 320, a CRL management unit 330, a correspondence information holding unit 340, and a CRL holding unit 350.

The communication unit 310 has a function for performing communication with the controllers 100a and 100b via the network 500.

The control unit 320 has a function for controlling the correspondence information holding unit 340 and managing the correspondence information indicating a connection relationship between a controller and a device, the ID of the connected controller, the ID of the device, the certificate ID, and the operation history of the device.

Upon receipt of a check request for checking whether or not the device is already registered in the correspondence information from the controller 100 via the communication unit 310, the control unit 320 reads the correspondence information from the correspondence information holding unit 340 and determines whether or not the device ID contained in the check request is registered in the correspondence information. If the device ID is not registered, the control unit 320 transmits, via the communication unit 310, an authentication continuation notification for permitting continuation of authentication to the controller 100 that has transmitted the check request. If the device ID is registered, the control unit 320 transmits, via the communication unit 310, a connected controller ID request for information concerning the controller ID that is held by the device as area network information, to the device having the device ID contained in the check request. If the controller ID is transmitted from the device in response to the request, the control unit 320 determines whether or not the received controller ID matches the controller ID associated with the device ID of the device in the correspondence information. If the controller IDs match, the control unit 320 transmits an authentication continuation notification for permitting continuation of authentication to the controller 100 that has transmitted the check request. If the controller IDs do not match, the control unit 320 transmits an authentication discontinuation notification indicating discontinuation of authentication to the controller 100 that has transmitted the check request. The control unit 320 additionally registers an authenticated pair of the device ID and the controller ID received from the controller 100 via the communication unit 310 in the correspondence information. In addition, upon receipt of a new CRL from the portal server 400 via the communication unit 310, the control unit 320 requests the CRL management unit 330 to register the CRL.

The CRL management unit 330 controls the CRL holding unit 350, and updates the CRL stored in the CRL holding unit 350 upon receipt of a new CRL from the control unit 320.

The correspondence information holding unit 340 is a database that holds the correspondence information indicating an authenticated pair of a device and a controller, the ID of the device, the ID of the controller, the IDs of the certificates, and so on. Specifically, the correspondence information holding unit 340 is implemented by a recording medium, such as a flash memory, an HDD, or an SSD.

The CRL holding unit 350 is a database that holds information concerning the CRL used in authentication. Specifically, the CRL holding unit 350 is implemented by a recording medium, such as a flash memory, an HDD, or an SSD. Details about the public key certificate and the CRL will be described later.

Portal Server 400

Figure 5:
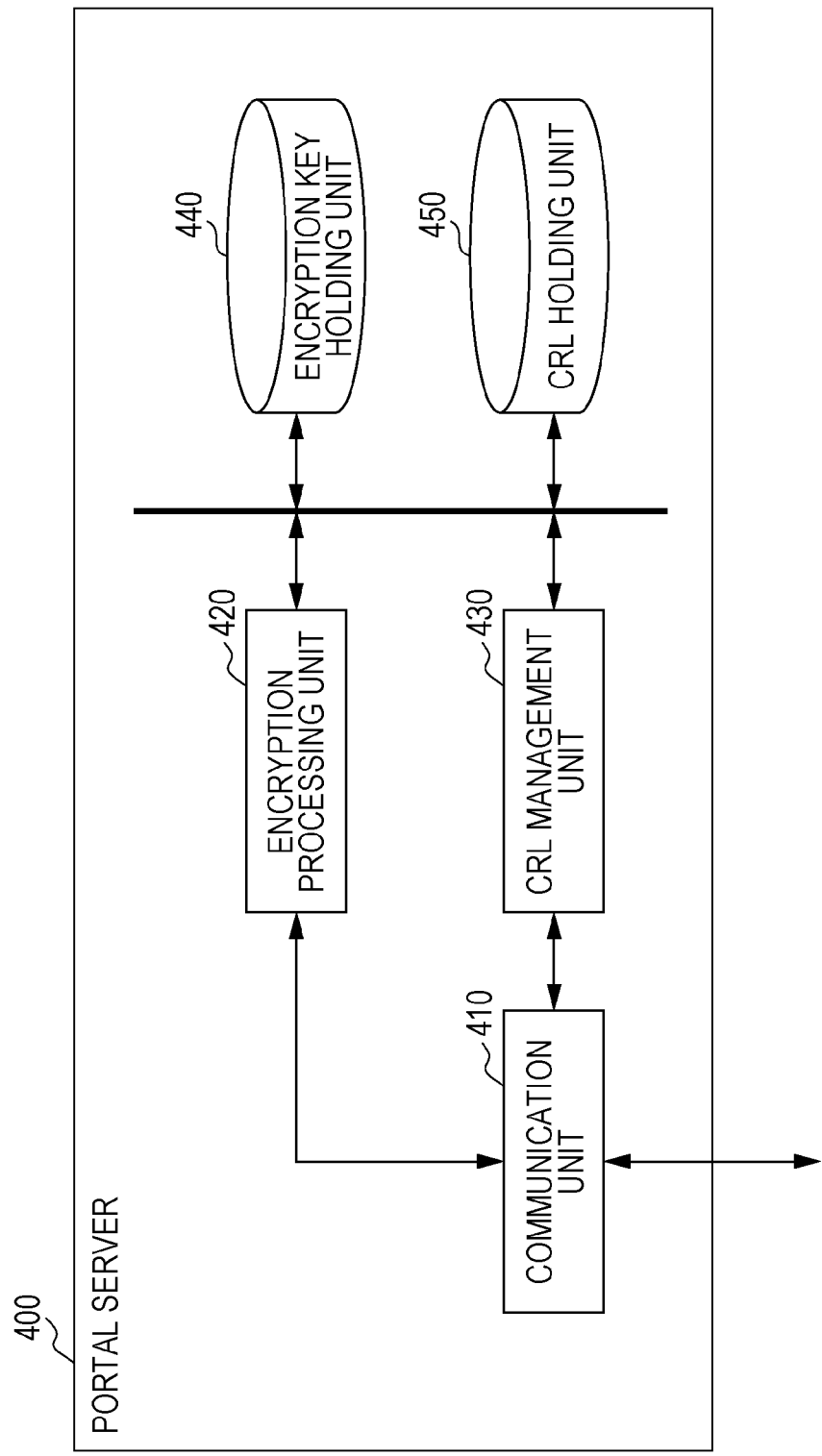
FIG. 5 is a block diagram illustrating a functional configuration of a portal server.

FIG. 5 is a block diagram illustrating a functional configuration of the portal server 400. As illustrated in FIG. 5, the portal server 400 includes a communication unit 410, an encryption processing unit 420, a CRL management unit 430, an encryption key holding unit 440, and a CRL holding unit 450.

The communication unit 410 has a function for performing communication with the manufacturer server 300, the controllers 100, and the devices 200 via the network 500.

The encryption processing unit 420 has a function for generating a signature of the CRL. Upon receipt of a signature generation request from the CRL management unit 430, the encryption processing unit 420 generates a signature of the CRL by using a secret key held by the encryption key holding unit 440. The encryption processing unit 420 also transfers the generated signature of the CRL to the CRL management unit 430.

The CRL management unit 430 has a function for controlling the CRL holding unit 450 and managing the CRL. Upon receipt of a CRL issue request from the manufacturer server 300, the CRL management unit 430 sets data of the CRL other than the signature and requests the encryption processing unit 420 to generate the signature of the CRL. The CRL management unit 430 receives the signature generated by the encryption processing unit 420 in response to the request, and stores the signature in the CRL holding unit 450. The CRL management unit 430 transmits the CRL newly issued to the manufacturer server 300, the controllers 100, and the devices 200 via the communication unit 410.

The encryption key holding unit 440 is a database that holds information concerning encryption keys used in authentication. Specifically, the encryption key holding unit 440 is implemented by a recording medium, such as a flash memory, an HDD, or an SSD.

The CRL holding unit 450 is a database that holds information concerning a CRL that is generated by the CRL management unit 430 and is used in authentication. Specifically, the CRL holding unit 450 is implemented by a recording medium, such as a flash memory, an HDD, or an SSD.

Data

Now, various types of data used in the unauthorized device detection system will be described.

Figure 6:
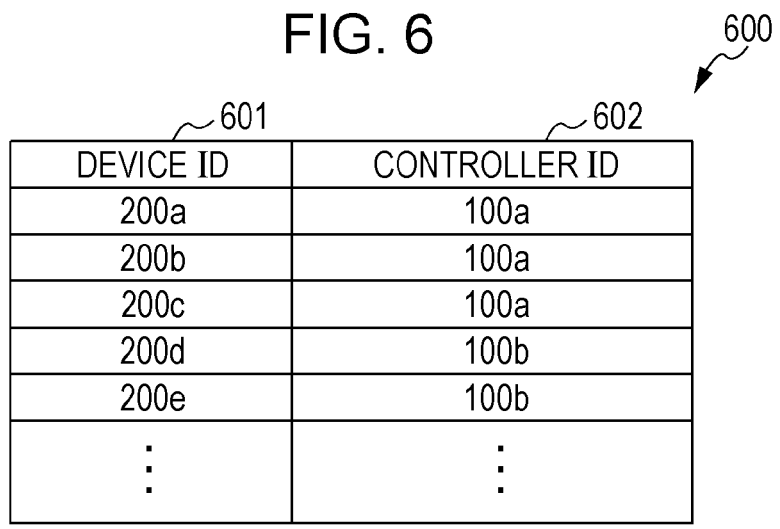
FIG. 6 is a conceptual data diagram illustrating a structure of correspondence information held by the manufacturer server.

FIG. 6 is a conceptual data diagram illustrating an example of a data structure of the correspondence information held by the manufacturer server 300. As illustrated in FIG. 6, correspondence information 600 is information in which a device ID 601 and a controller ID 602 are associated with each other.

The device ID 601 is identification information that uniquely identifies a device on a network. To make it easier to understand a correspondence to the system illustrated in FIG. 1, the reference sign assigned to each device 200 in FIG. 1 is used as the device ID 601 in FIG. 6; however, the device ID 601 is usually identification information unique to each device and a combination of numerals, alphabets, signs, and the like is used as the device ID 601. The similar device IDs are used in FIG. 7 and the subsequent figures.

The controller ID 602 is identification information that uniquely identifies a controller on a network. To make it easier to understand a correspondence to the system illustrated in FIG. 1, the reference sign assigned to each controller in FIG. 1 is used as the controller ID 602; however, the controller ID 602 is usually identification information unique to each controller and a combination of numerals, alphabets, signs, and the like is used as the controller ID 602. The similar controller IDs are used in FIG. 7 and the subsequent figures.

The correspondence information 600 held by the manufacturer server 300 allows the manufacturer server 300 to recognize a correspondence between a device ID and a controller ID which serves as area network information. For this reason, if a device indicated by the device ID in the correspondence information 600 does not hold the controller ID associated as the area network information with the device ID in the correspondence information 600, the device can be identified as an unauthorized device. Thus, an unauthorized device which is not identifiable through authentication hitherto performed between the device and the controller can be detected.

Figure 7:
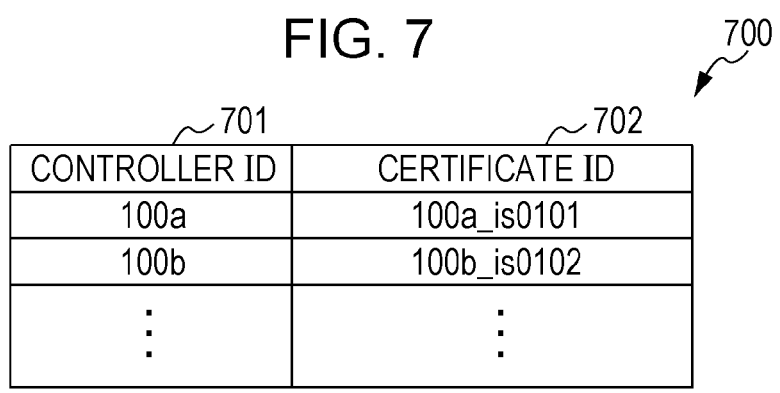
FIG. 7 is a conceptual data diagram illustrating a structure of controller information held by the device.

FIG. 7 is a conceptual data diagram illustrating an example of a data structure of the controller information held by the device 200a. As illustrated in FIG. 7, controller information 700 is information in which a controller ID 701 and a certificate ID 702 are associated with each other.

The controller ID 701 is identification information that uniquely identifies a controller to which the device 200 is or has been connected on a network. Because the controller does not belong to a plurality of area networks, the controller ID 701 can be used as area network information concerning an area network to which the device 200a belongs or has belonged.

The certificate ID 702 is information indicating the ID of a public key certificate of the controller corresponding to the controller ID 701. Note that the certificate ID illustrated in FIG. 7 is merely an example, and any given type of identification information uniquely issued to each controller can be used. In general, a combination of numerals, alphabets, signs, and the like is used as the certificate ID 702.

The controller information 700 allows the device 200 to transmit the controller ID serving as the area network information in response to a connected controller ID request from the manufacturer server 300. Note that FIG. 7 illustrates the case where the device holds information concerning a plurality of controllers; however, there may be cases where only one information item is held or no information item is held. In the case where a home area network includes a plurality of controllers and the device has performed authentication for connections to the plurality of controllers, the controller information 700 includes entries for the plurality of controllers 100. If the device 200a is not currently connected to any controller but has performed authentication for a connection to a controller, the controller information 700 includes an entry for the controller.

Figure 8:
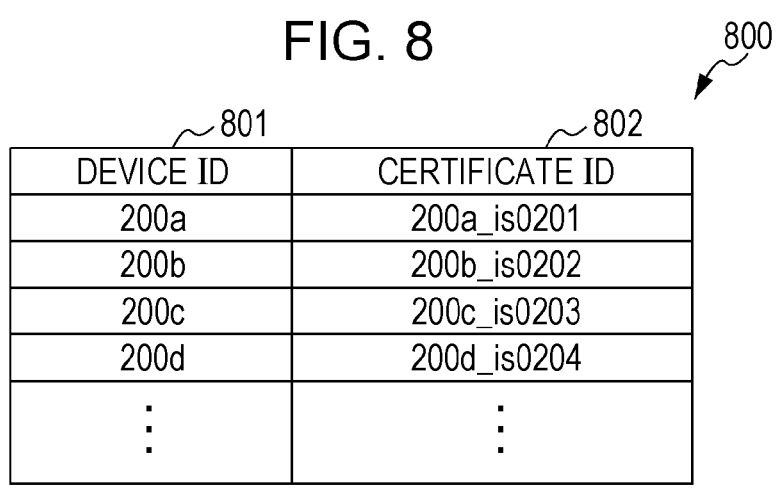
FIG. 8 is a conceptual data diagram illustrating a structure of device information held by the controller.

FIG. 8 is a conceptual data diagram illustrating an example of a data structure of the device information held by the controller 100a. As illustrated in FIG. 8, device information 800 is information in which a device ID 801 and a certificate ID 802 are associated with each other.

The device ID 801 is identification information that uniquely identifies a device on a network.

The certificate ID 802 is information indicating an ID of a public key certificate of the controller corresponding to the device ID 801. Note that the certificate ID illustrated in FIG. 8 is merely an example, and any given type of identification information uniquely issued to each controller can be used. In general, a combination of numerals, alphabets, signs, and the like is used as the certificate ID 802.

The device information 800 allows the controller 100 to recognize devices which are connected thereto and successfully authenticated.

Figure 9:
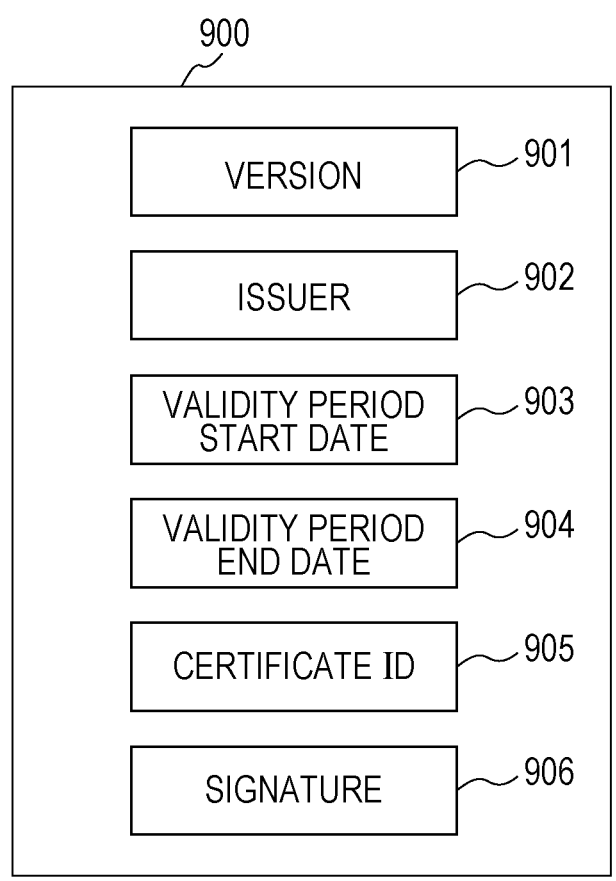
FIG. 9 is a conceptual data diagram illustrating a structure of a public key certificate.

FIG. 9 is a conceptual data diagram illustrating an example of a data structure of a public key certificate. As illustrated in FIG. 9, a public key certificate 900 includes a version 901, an issuer 902, a validity period start date 903, a validity period end date 904, a certificate ID 905, and a signature 906.

The version 901 is information indicating a version of the public key certificate 900.

The issuer 902 is information indicating a certificate authority that has issued the public key certificate 900, and is information that uniquely identifies the certificate authority.

The validity period start date 903 is information indicating the start date on which the public key certificate 900 becomes effective.

The validity period end date 904 indicates the last date up until the public key certificate 900 is effective, and is information indicating the previous day of the day on which the public key certificate expires.

The certificate ID 905 is identification information that uniquely identifies the public key certificate 900.

The signature 906 is information indicating the portal server 400 which serves as the certificate authority.

Figure 10:
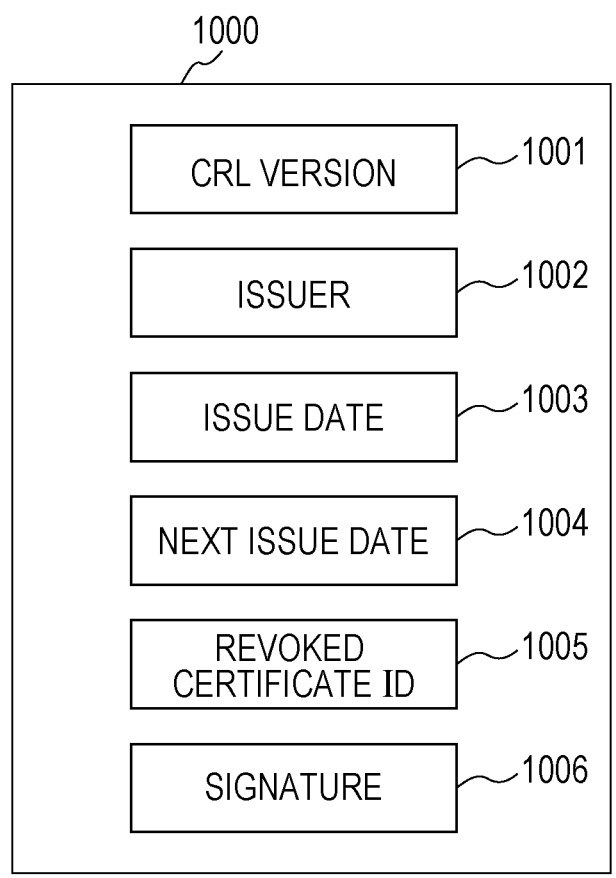
FIG. 10 is a conceptual data diagram illustrating a structure of a CRL.

FIG. 10 is a conceptual data diagram illustrating an example of a data structure of the CRL. As illustrated in FIG. 10, a CRL 1000 is information including a CRL version 1001, an issuer 1002, an issue date 1003, a next issue date 1004, a revoked certificate ID 1005, and a signature 1006.

The CRL version 1001 is information indicating a version of the CRL 1000. Every time a certificate is revoked, the CRL needs to be updated. Thus, the CRL version 1001 is used to allow the devices 200, the controllers 100, and the manufacturer server 300 to recognize whether this CRL is newer information by managing the version of the CRL. Specifically, each apparatus can determine whether to update the CRL held therein to the received one or discard the received one by comparing the version of the received CRL with the version of the held CRL.

The issuer 1002 is information that uniquely identifies a certificate authority that has issued the CRL 1000.

The issue date 1003 is information indicating the date on which the CRL 1000 was issued.

The next issue date 1004 is information indicating the date on which a new version of the CRL 1000 is to be issued.

The revoked certificate ID 1005 is information indicating IDs of the revoked public key certificates, and includes one or more certificate IDs. Public key certificates whose certificate IDs are stored in this field are revoked, and thus authentication performed using any of the public key certificates having these IDs fails.

The signature 1006 is information indicating the portal server 400 which serves as the certificate authority.

The above is the description regarding data used in the unauthorized device detection system.

Operations

Now, operations performed by the device 200, the controller 100, and the manufacturer server 300 included in the unauthorized device detection system will be described.

Figure 11:
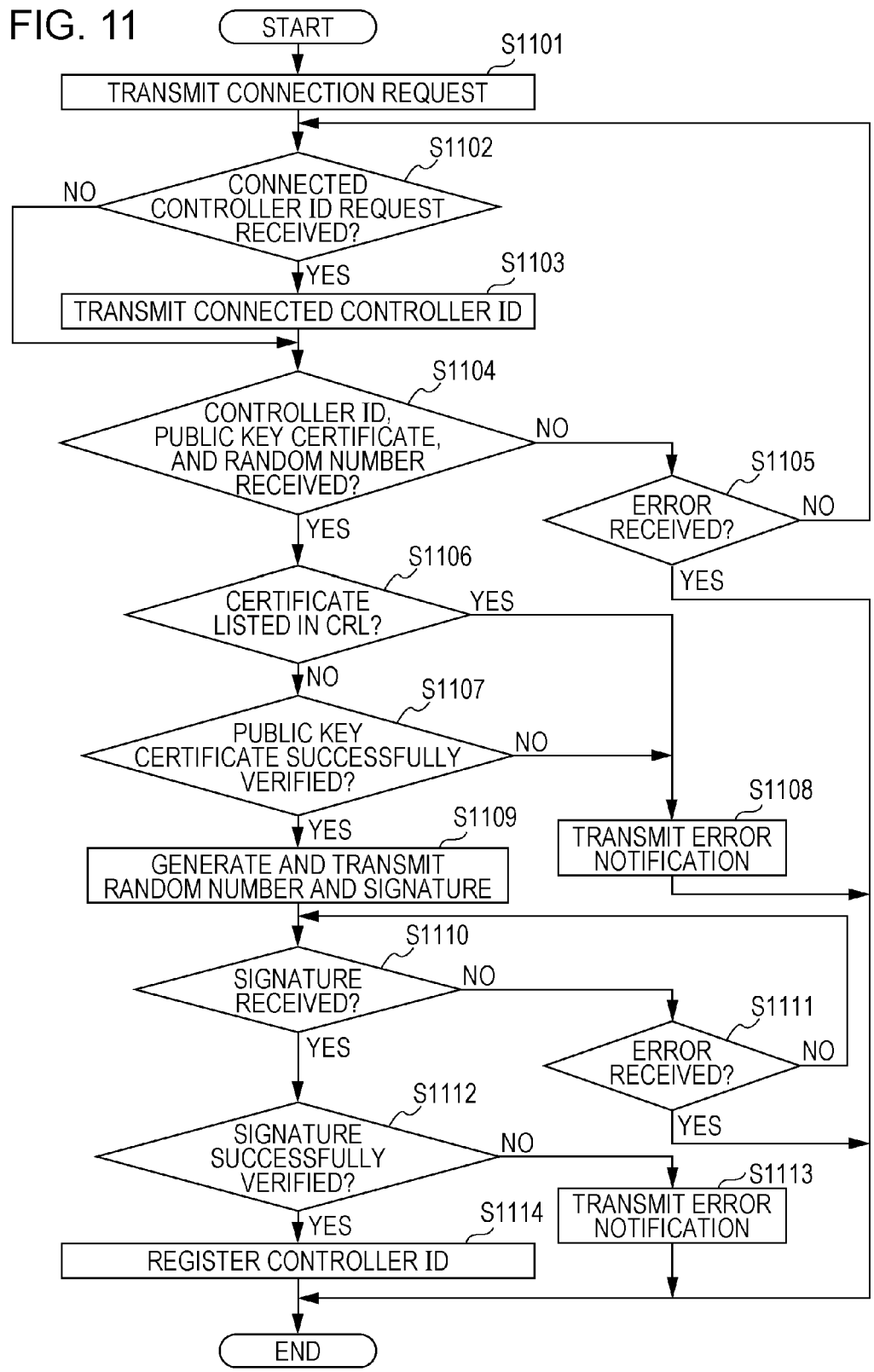
FIG. 11 is a flowchart illustrating an operation performed by the device.

FIG. 11 is a flowchart illustrating an operation performed by the device 200 at the time of authentication. A description will be given of an operation performed by the device 200a here; however, it is assumed that the other devices 200 operate in substantially the same manner. In addition, FIG. 11 illustrates an example case where the device 200a attempts to establish a connection to the controller 100a; however, the connection destination controller is not limited to the controller 100a just like the device.

Upon the device 200a being connected to the controller 100a, the control unit 220 obtains a public key certificate held therein from the authentication information holding unit 240. The control unit 220 then transmits, to the connected controller 100a via the communication unit 210, a connection request which contains the obtained public key certificate and the device ID of the device 200a (step S1101).

If the device 200a receives a connected controller ID request after the transmission of the connection request (YES in step S1102), the control unit 220 obtains a connected controller ID (i.e., the controller ID 701) held as area network information from the controller information 700 stored in the controller information holding unit 250. The control unit 220 then transmits the obtained connected controller ID to the connected controller 100a via the communication unit 210 (step S1103). If no controller ID is registered in the controller information 700, the control unit 220 transmits information indicating that no controller ID (i.e., no area network information) is registered in the controller information 700. If the device 200a does not receive a connected controller ID request after the transmission of the connection request (NO in step S1102), the process proceeds to step S1104.

If the device 200a receives a controller ID, a public key certificate, and a random number from the controller 100a after the transmission of the connection request (YES in step S1104), the control unit 220 requests the authentication processing unit 230 to perform verification on the received public key certificate. Then, the authentication processing unit 230 determines whether or not the certificate ID of the received public key certificate is registered in the CRL (step S1106). The authentication processing unit 230 determines whether or not the certificate ID of the public key certificate is registered in the CRL by determining whether or not the certificate ID of the public key certificate received from the control unit 220 matches any of certificate IDs contained in the CRL stored in the authentication information holding unit 240. If the device 200a does not receive a controller ID, a public key certificate, and a random number (NO in step S1104) but receives an error (YES in step S1105), the control unit 220 determines that authentication has failed, and terminates the process. If the device 200a does not receive an error (NO in step S1105), the process returns to step S1102.

If the certificate ID of the received public key certificate is not registered in the CRL (NO in step S1106), the authentication processing unit 230 performs verification to determine authenticity of the received public key certificate (step S1107). Because the method for verifying a public key certificate is a well-known technique, a description thereof will be omitted.

If the received public key certificate is successfully verified (YES in step S1107), the authentication processing unit 230 generates a random number and a signature, and transmits the generated random number and signature to the controller 100a via the communication unit 210 (step S1109).

If the certificate ID of the received public key certificate is registered in the CRL (YES in step S1106) or if authentication of the public key certificate has failed (NO in step S1107), the authentication processing unit 230 notifies the control unit 220 that authentication has failed. Upon receipt of the notification, the control unit 220 transmits an error notification to the controller 100a via the communication unit 210 (step S1108). Then, the control unit 220 determines that the process for establishing a connection to the controller 100a has failed, and terminates the process. At this time, the control unit 220 may determine that the controller 100a to which the device 200a has attempted to establish a connection as an unauthorized device and may store the controller ID thereof in the controller information holding unit 250.

If the device 200a receives a signature after the transmission of a random number and a signature (YES in step S1110), the authentication processing unit 230 determines whether or not the received signature matches the generated signature (step S1112). If it is determined that the signatures match (YES in step S1112), the authentication processing unit 230 notifies the control unit 220 that authentication is successful. Upon receipt of this notification, the control unit 220 registers the controller ID of the controller 100a as the connected controller ID in the controller information holding unit 250 (step S1114), and then terminates the authentication process.

If the device 200a receives an error notification in step S1110 instead of a signature (YES in step S1111), the control unit 220 determines that authentication has failed, and terminates the process. The control unit 220 stands by until the device 200a receives a signature or an error notification (NO in step S1111).

If verification of a signature is unsuccessful (NO in step S1112), the authentication processing unit 230 notifies the control unit 220 that authentication has failed. The control unit 220 transmits an error notification to the controller 100a via the communication unit 210 (step S1113), and terminates the process. At this time, the control unit 220 may hold the controller ID of the controller 100a as an ID of an unauthorized device in the controller information holding unit 250.

The above is the authentication process performed by the device 200a.

Figure 12:
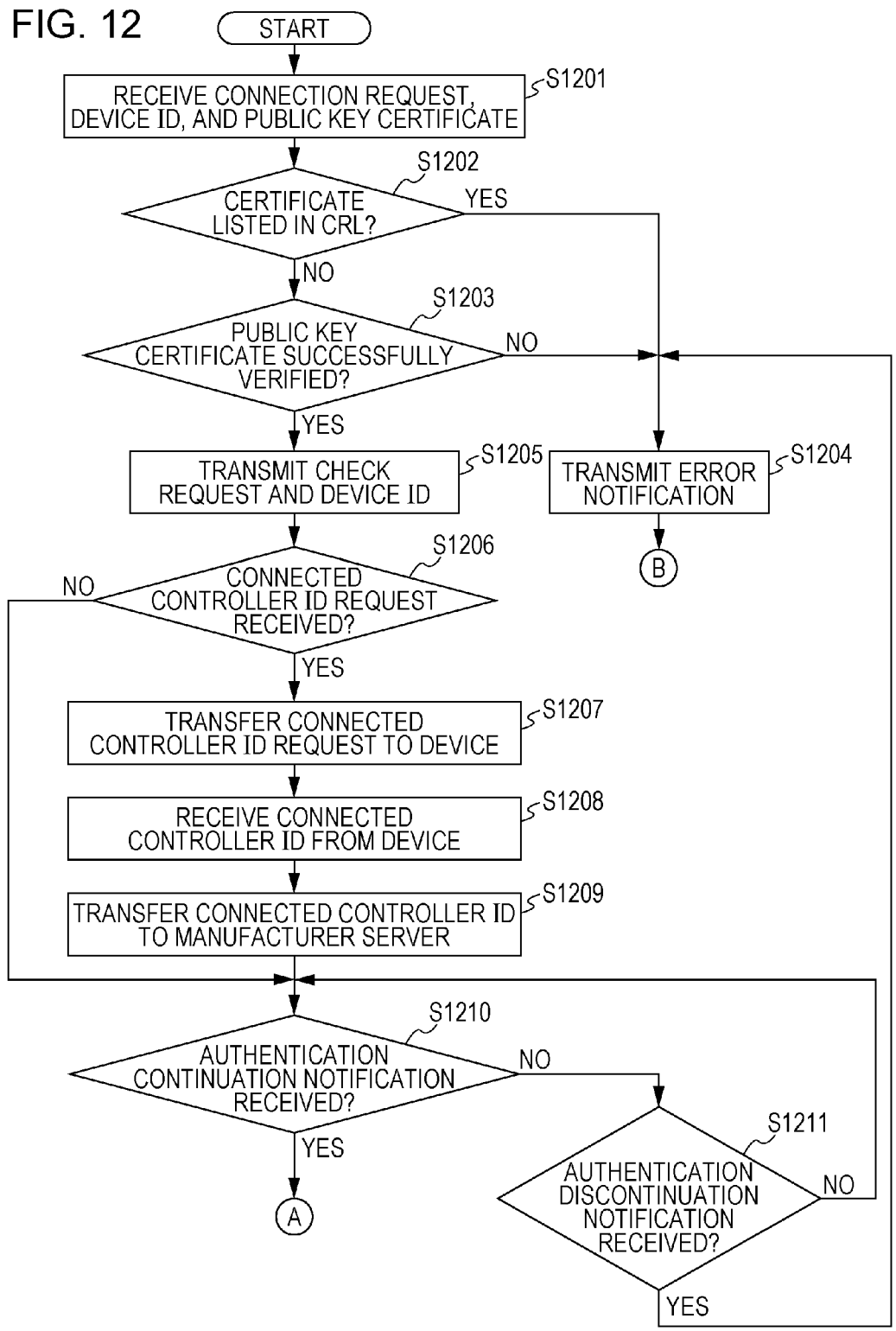
FIG. 12 is a flowchart (part 1) illustrating an operation performed by the controller.
Figure 13:
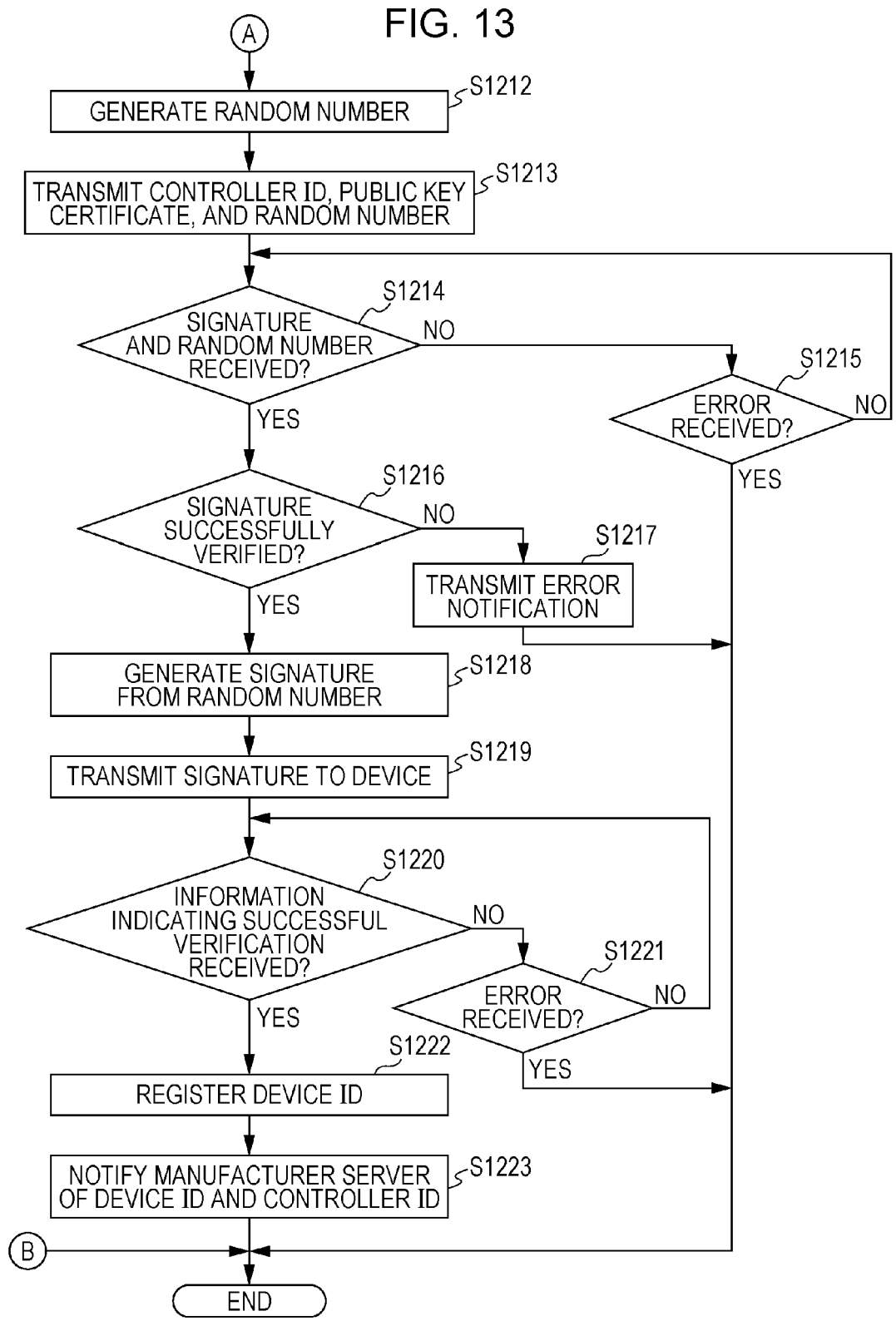
FIG. 13 is a flowchart (part 2) illustrating the operation performed by the controller and is continued from FIG. 12.

FIGS. 12 and 13 are flowcharts illustrating an operation performed by the controller 100 at the time of authentication. A description will be given of an operation performed by the controller 100a here; however, it is assumed that the controller 100b operates in substantially the same manner. In addition, an operation performed in the case where the device 200a transmits a connection request to the controller 100a is described here; however, the device to be connected to the controller 100a is not limited to the device 200a.

As illustrated in FIG. 12, the communication unit 110 of the controller 100a receives a connection request from the device 200a newly connected thereto (step S1201). The connection request contains the device ID of the device 200a and a public key certificate held by the device 200a.

Upon receipt of the connection request, the control unit 120 transfers the received public key certificate to the authentication processing unit 130 and requests the authentication processing unit 130 to perform authentication of the public key certificate. In response to the request, the authentication processing unit 130 reads out the CRL from the authentication information holding unit 140 and checks whether or not the ID of the public key certificate received from the control unit 120 is registered in the CRL (step S1202).

If the ID of the received public key certificate is not registered in the CRL (NO in step S1202), the authentication processing unit 130 performs verification on the public key certificate (step S1203).

If the ID of the received public key certificate is registered in the CRL (YES in step S1202) or if verification of the public key certificate is unsuccessful (NO in step S1203), the authentication processing unit 130 notifies the control unit 120 of information indicating so. Upon receipt of this notification, the control unit 120 transmits, via the communication unit 110, an error notification to the device 200a that has transmitted the connection request (step S1204) and terminates the authentication process.

If verification of the public key certificate is successful (YES in step S1203), the authentication processing unit 130 notifies the control unit 120 that the public key certificate has been successfully verified. Upon receipt of this notification, the control unit 120 transmits, to the manufacturer server 300, a check request in order to check whether or not the device that has transmitted the connection request is registered in the manufacturer server 300. The check request contains the device ID of the device and requests the manufacturer server 300 to check whether the device ID is registered therein (step S1205).

If a connected controller ID request for a connected controller ID held by the device assigned the transmitted device ID is received from the manufacturer server 300 (YES in step S1206), the control unit 120 of the controller 100a transfers this connected controller ID request to the device 200a that has transmitted the connection request (step S1207).

If the control unit 120 receives a controller ID transmitted from the device 200a in response to the connected controller ID request (step S1208), the controller 100a then transfers this controller ID to the manufacturer server 300 (step S1209).

If an authentication continuation notification is received from the manufacturer server 300 (YES in step S1210), the process proceeds to step S1212 in FIG. 13. If an authentication discontinuation notification is received from the manufacturer server 300 (YES in step S1211), the control unit 120 transmits an error notification to the device 200a via the communication unit 110 (step S1204), and terminates the authentication process.

If an authentication continuation notification is received from the manufacturer server 300 (YES in step S1210), the control unit 120 transfers the authentication continuation notification to the authentication processing unit 130. Then, the authentication processing unit 130 generates a random number (step S1212).

The authentication processing unit 130 then transmits, via the communication unit 110, the controller ID of the controller 100a, the public key certificate of the controller 100a, and the generated random number to the device 200a that has transmitted the connection request (step S1213).

If an error is received from the device 200a in response to this transmission (YES in step S1215), the controller 100a terminates the authentication process. In contrast, if a signature and a random number are received from the device 200a (YES in step S1214), the authentication processing unit 130 performs verification of the received signature (step S1216). If verification of the signature is successful (YES in step S1216), the authentication processing unit 130 generates a signature from the random number received in step S1214 (step S1218). The authentication processing unit 130 transmits the generated signature to the device 200a via the communication unit 110 (step S1219). If verification of the signature is unsuccessful (NO in step S1216), the authentication processing unit 130 notifies the control unit 120 that authentication has failed. The control unit 120 transmits an error notification to the device 200a (step S1217), and terminates the authentication process.

If information indicating that verification is successful is received from the device 200a (YES in step S1220) after the signature is transmitted (step S1219), the control unit 120 associates the device ID of the device 200a with the ID of the public key certificate of the device 200a, and additionally registers them in the device information held by the device information holding unit 150 (step S1222). The control unit 120 then transmits a pair of the device ID (i.e., the device ID of the device 200a) that has been additionally registered and the controller ID thereof (i.e., the controller ID of the controller 100a) to the manufacturer server 300 via the communication unit 110 (step S1223). In this way, IDs of the device 200a and the controller 100a are stored in the correspondence information in the manufacturer server 300 in association with each other, and are effectively used for detection of an unauthorized device.

If information indicating that verification has failed, that is, an error is received from the device 200a (YES in step S1221), the control unit 120 terminates the authentication process.

Figure 14:
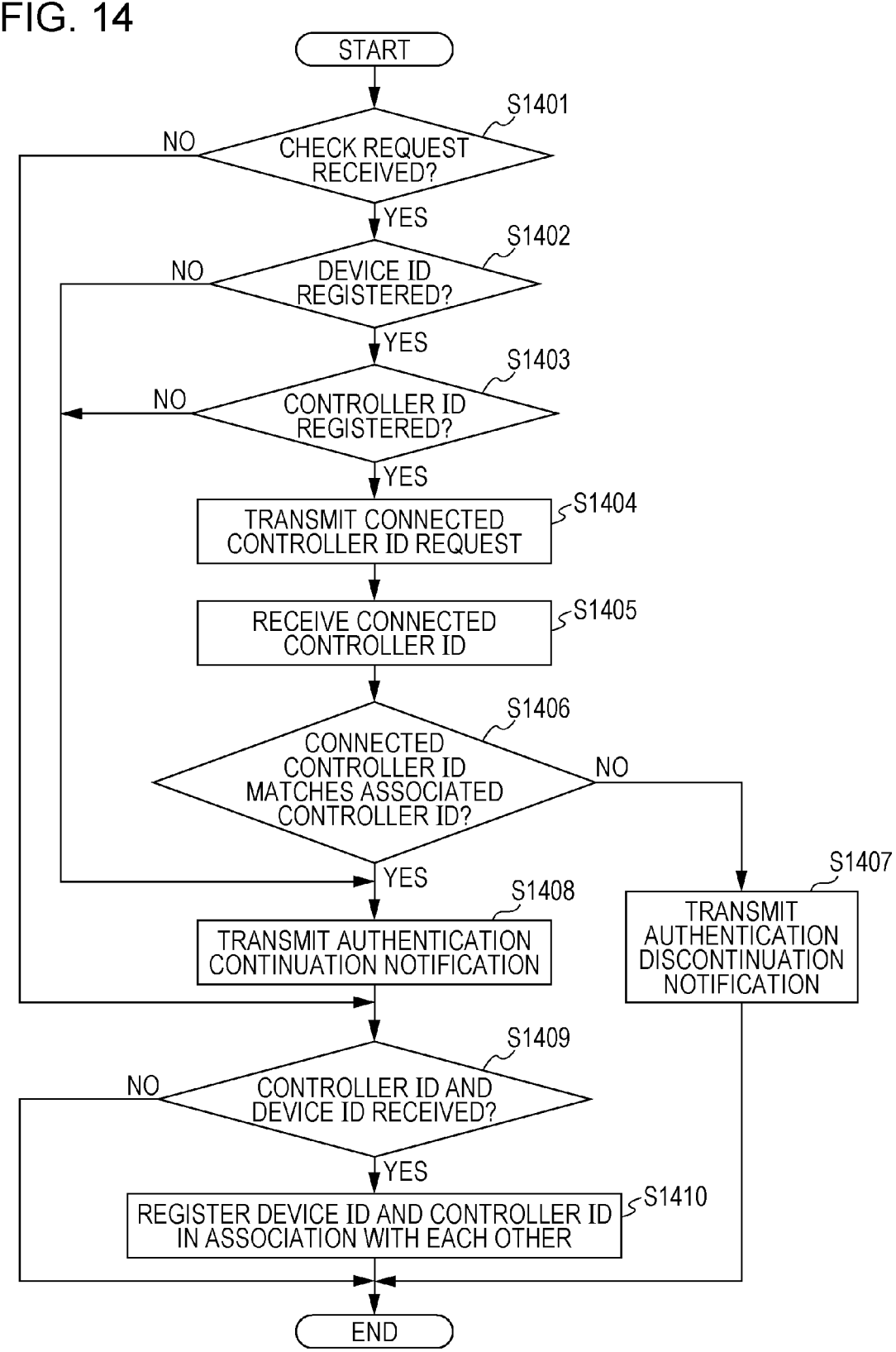
FIG. 14 is a flowchart illustrating an operation performed by the manufacturer server.

FIG. 14 is a flowchart illustrating a process performed by the manufacturer server 300 during the authentication process performed between the device 200 and the controller 100.

Upon receipt of a device check request to check whether or not the device ID is registered in the correspondence information (YES in step S1401), the control unit 320 of the manufacturer server 300 reads out the correspondence information from the correspondence information holding unit 340. The control unit 320 then determines whether or not the received device ID is registered in the correspondence information (step S1402).

If the received device ID is registered in the correspondence information (YES in step S1402), the control unit 320 determines whether or not a controller ID is registered as area network information in association with the device ID (step S1403).

If the controller ID is registered (YES in step S1403), the control unit 320 transmits, to the device assigned the received device ID, a connected controller ID request for a controller ID (i.e., the controller ID of the controller to which the device is connected) held in the device as the area network information (step S1404).

If the manufacturer server 300 receives the controller ID from the device (step S1405), the control unit 320 determines whether or not the received controller ID matches the controller ID associated with the device ID in the correspondence information (step S1406). If the received information concerning the controller ID indicates that there is no registered controller ID, the control unit 320 determines that the controller IDs do not match.

If the controller IDs match (YES in step S1406), the control unit 320 transmits an authentication continuation notification to the controller that has transmitted the check request (step S1408). If the device ID is not registered in the correspondence information (NO in step S1402) or if the device ID is registered in the correspondence information but no controller ID is associated with it in the correspondence information (NO in step S1403), the control unit 320 transmits an authentication continuation notification to the controller (step S1408).

If the controller ID received from the device does not match the controller ID associated in the correspondence information with the device ID contained in the check request (NO in step S1406), the control unit 320 transmits an authentication discontinuation notification to the controller via the communication unit 310 (step S1407), and terminates the process. If it is determined in step S1406 that the controller IDs do not match, the manufacturer server 300 holds the device ID contained in the check request and detects the device that has transmitted the connection request as an unauthorized device.

If a pair of the controller ID and the device ID is received from the controller 100 (YES in step S1409), the control unit 320 of the manufacturer server 300 additionally registers the received pair of the controller ID and the device ID in the correspondence information 600 held by the correspondence information holding unit 340 (step S1410), and terminates the process.

In this way, a new pair of a device ID and a controller ID is registered in the correspondence information and is used for detection of an unauthorized device later.

Referring next to sequence diagrams of FIGS. 15 and 16, communication performed among the device 200, the controller 100, and the manufacturer server 300 when they operate in a manner as illustrated in FIGS. 11 to 14 will be described.

Figure 15:
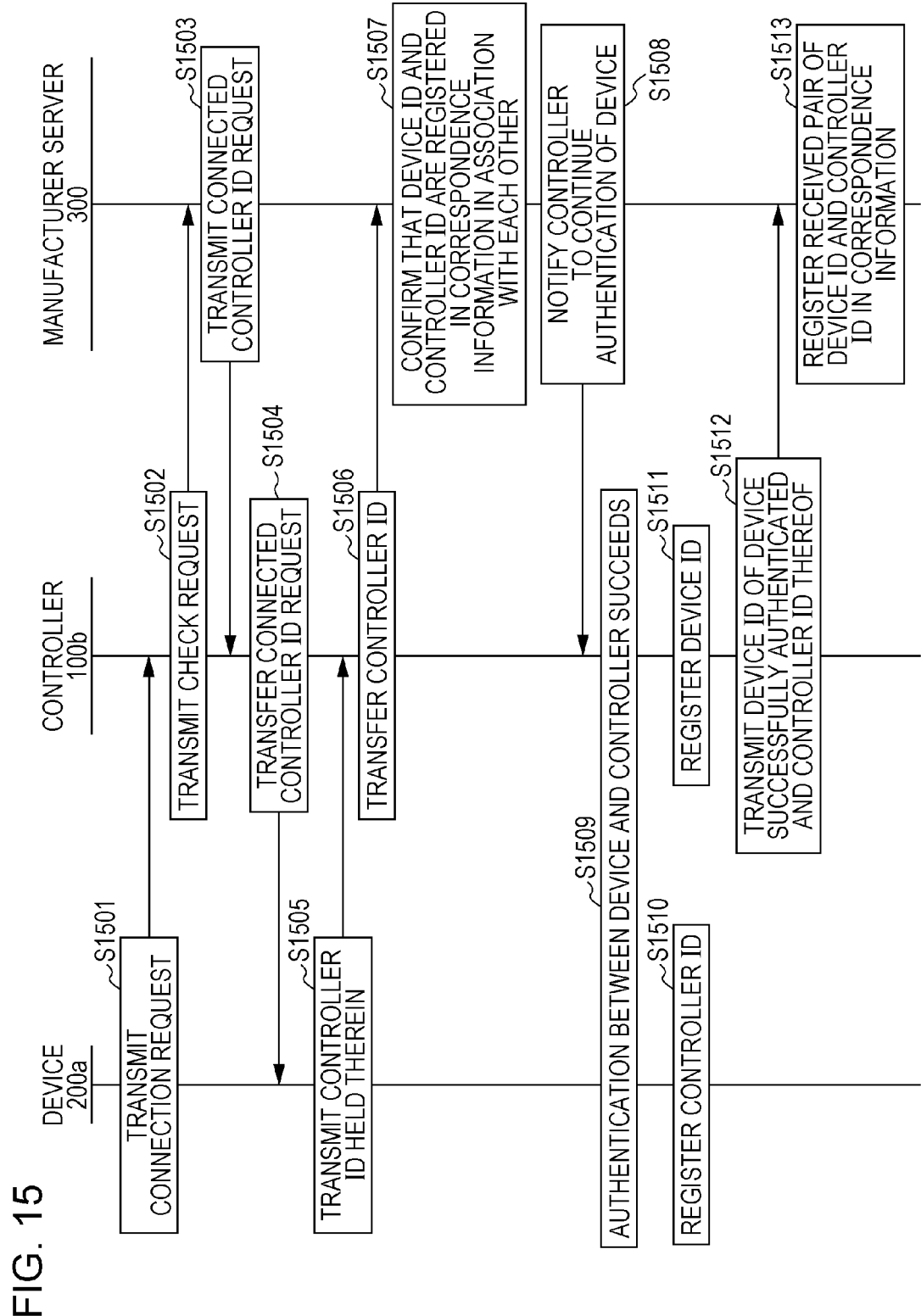
FIG. 15 is a sequence diagram illustrating an operation performed by the unauthorized device detection system when an authorized device attempts to establish a connection to a new controller.

FIG. 15 is a sequence diagram illustrating communication performed among the device 200, the controller 100, and the manufacturer server 300 in the unauthorized device detection system in the case where the device 200 is already registered in the manufacturer server 300 and successfully establishes a connection to a new controller. FIG. 15 illustrates an example in which the device 200a has been connected to the controller 100a and changes the connection destination to the controller 100b. Accordingly, at the time when the authentication process is started between the device 200a and the controller 100b, the device ID of the device 200a is associated with the controller ID of the controller 100a in the correspondence information held by the manufacturer server 300.

The device 200a transmits a connection request containing the device ID thereof to the controller 100b (step S1501).

Upon receipt of the connection request, the controller 100b transmits, to the manufacturer server 300, a check request to make an inquiry as to whether or not the device ID of the device 200a is registered in the manufacturer server 300 (step S1502).

Upon receipt of the check request, the manufacturer server 300 performs verification to determine whether or not the device ID of the device 200a is registered in the correspondence information. Because authentication has been performed for a connection between the device 200a and the controller 100a, the device ID of the device 200a is registered in the correspondence information. Accordingly, the manufacturer server 300 transmits, to the controller 100b, a connected controller ID request to request the device 200a to provide a controller ID that is held by the device 200a as area network information (step S1503).

Upon receipt of the connected controller ID request, the controller 100*b* transfers this connected controller ID request to the device 200*a* without processing it (step S1504).

Upon receipt of the connected controller ID request transferred thereto, the device 200*a* obtains the controller ID (here, the controller ID of the controller 100*a*) from the controller information held therein. The device 200*a* then transmits the obtained controller ID to the controller 100*b* (step S1505).

Upon receipt of the controller ID, the controller 100*b* transfers the received controller ID to the manufacturer server 300 without processing it (step S1506).

Upon receipt of the controller ID, the manufacturer server 300 determines whether or not the received controller ID matches the controller ID associated in the correspondence information with the device ID contained in the check request received in step S1502 (step S1507). Here, the received controller ID (i.e., the controller ID of the controller 100*a*) matches the controller ID (i.e., the controller ID of the controller 100*a*) associated in the correspondence information with the device ID (i.e., the device ID of the device 200*a*).

Thus, the manufacturer server 300 instructs the controller 100*b* to continue authentication of the device 200*a* (step S1508).

Upon receipt of the instruction, the controller 100*b* and the device 200*a* perform an authentication process by using public key certificates, random numbers, and signatures (see steps S1104 to S1112 in FIG. 11 and steps S1212 to S1220 in FIG. 13). It is assumed here that the device 200*a* and the controller 100*b* have successfully authenticated each other (step S1509).

Thus, the device 200*a* registers the controller ID of the controller 100*b* which is the connection destination and the certificate ID of the controller 100*b* in the controller information in association with each other (step S1510). The controller 100*b* also registers the device ID of the connected device 200*a* and the certificate ID of the device 200*a* in the device information in association with each other (step S1511).

The controller 100*b* then transmits, to the manufacturer server 300, connection information which contains the controller ID of the controller 100*b* and information concerning the device 200*a* to which a connection has been newly established as a result of successful authentication (step S1512).

Upon receipt of the connection information, the manufacturer server 300 additionally registers the received device ID and the controller ID in the correspondence information in association with each other (step S1513). With this configuration, even if an unauthorized device having the device ID of the device 200*a* is newly connected to the unauthorized device detection system later, the unauthorized device does not hold the controller ID. Thus, the manufacturer server 300 can detect the newly connected device as an unauthorized device.

Figure 16:
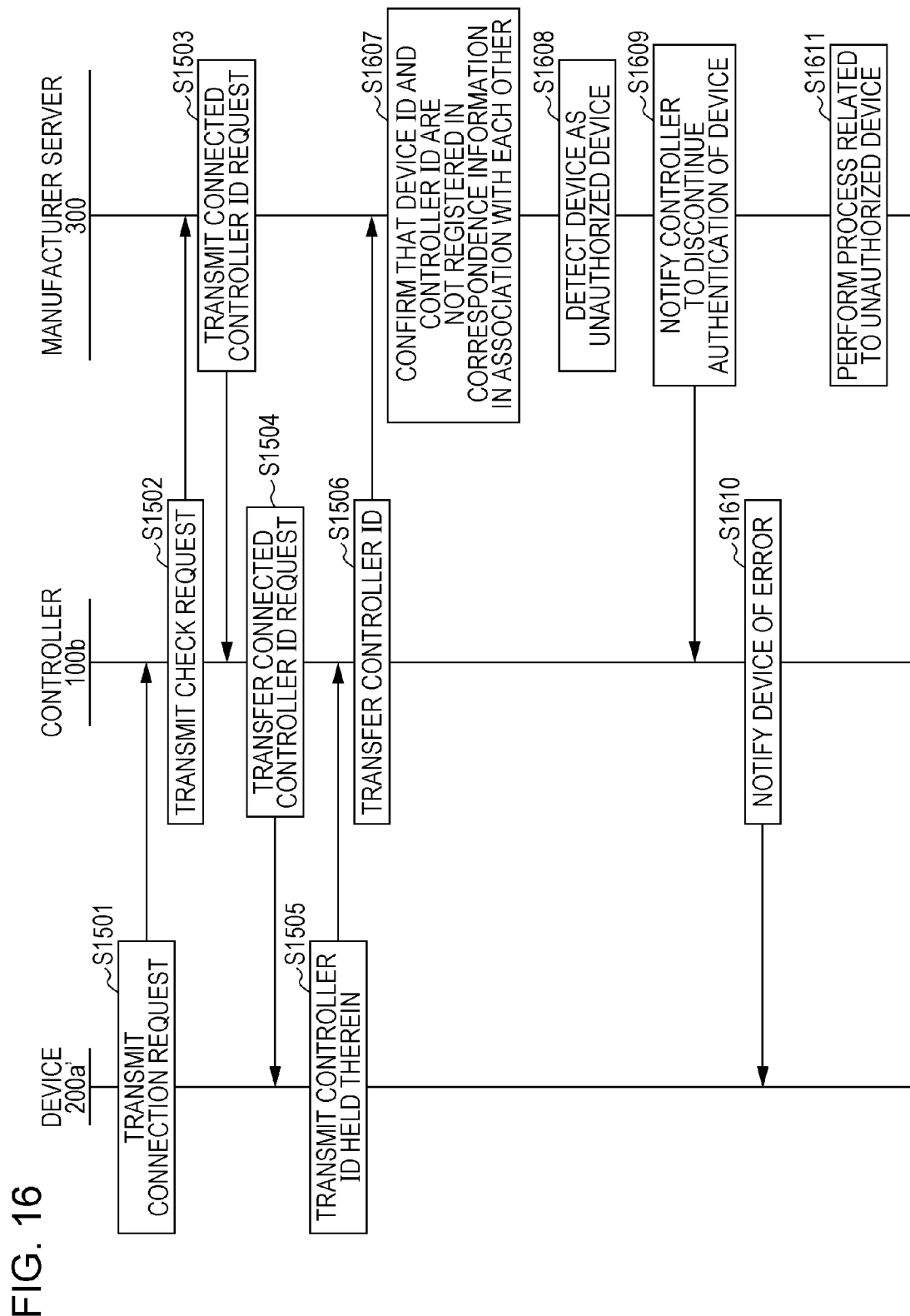
FIG. 16 is a sequence diagram illustrating an operation performed by the unauthorized device detection system when an unauthorized device attempts to establish a connection to a controller.

FIG. 16 is a sequence diagram illustrating communication performed among a device 200*a*', the controller 100*b*, and the manufacturer server 300 included in the unauthorized device detection system in the case where an unauthorized device is detected.

It is assumed here that the device 200*a*' is an unauthorized device that attempts to newly establish a connection to the controller 100*b* and has the same device ID as the device 200*a*. It is also assumed here that the device 200*a* which is an authorized device is connected to the controller 100*a*, that is, the device ID of the device 200*a* is associated in the correspondence information with the controller ID of the controller 100*a*. Further, it is assumed that the device 200*a*' holds a controller ID different from that of the controller 100*a*.

As for communication performed by the device 200*a*', the controller 100*b*, and the manufacturer server 300 in this unauthorized device detection system, processing up to step S1506 illustrated in FIG. 16 is substantially the same as that of FIG. 15, and thus a description thereof is omitted.

In step S1607, upon receipt of a controller ID, the manufacturer server 300 determines whether or not the received controller ID matches the controller ID associated in the correspondence information with the device ID contained in the check request received in step S1502 (step S1607). In this case, the received controller ID (i.e., the controller ID of a controller different from the controller 100*a*) does not match the controller ID (i.e., the controller ID of the controller 100*a*) associated in the correspondence information with the device ID (i.e., the device ID of the device 200*a*).

Accordingly, the manufacturer server 300 detects the device 200*a*' as an unauthorized device (step S1608).

Then, the manufacturer server 300 instructs the controller 100*b* to discontinue the authentication process (step S1609).

Upon receipt of the instruction to discontinue the authentication process, the controller 100*b* discontinues the authentication process and transmits an error notification to the device 200*a*' (step S1610).

Upon receipt of the error notification, the device 200*a*' discontinues the authentication process.

In addition, the manufacturer server 300 performs a process for handling an unauthorized device, such as a process for identifying the device 200*a*' (e.g., which device is the unauthorized device 200*a*' and where the device is placed) if necessary (step S1611). A general process is performed as the process related to an unauthorized device, and thus a detailed description thereof is omitted here.

Brief Account

As described in the exemplary embodiment, in the case where an authentication process performed between the device and the controller is successful, correspondence information indicating the pair is held by the manufacturer server 300. This configuration makes it possible to, when a new device and the controller start authentication, detect the new device as an unauthorized device in the case where the device ID of the new device is already registered in the correspondence information but the device does not hold the controller ID associated in the correspondence information with the device ID.

As a result, a situation in which there are a plurality of devices having the same device ID on a network can be prevented. Thus, for example, a situation in which a device that does not have to operate operates when household electrical appliances are controlled via a network from outside can be prevented.

Modifications

While the unauthorized device detection method according to an aspect of the present disclosure has been described in accordance with the exemplary embodiment, the present disclosure is not limited to this exemplary embodiment. Various modifications within the spirit of the present disclosure will be described below.

(1) In the above-described exemplary embodiment, the controller ID is used as the area network information; however, the area network information is not limited to this particular information. Any given form of information that identifies an area network can be used.

For example, in addition to an identifier uniquely assigned to a controller, a MAC address of the controller which is uniquely assigned to the controller or an area network identifier that identifies an area network in the system may be used. The area network identifier may be set by an operator who manages the unauthorized device detection system or a user who uses the unauthorized device detection system, or an area network name may be set in advance for the controller when the controller is shipped.

Further, as the area network information, information indicating a configuration of the area network may be used.

Now, the case where information indicating a configuration of an area network is used as the area network information will be described in detail.

The information indicating the configuration of the area network is group information indicating devices belonging to the area network. When viewed on a home-by-home basis, types of devices such as a television, a refrigerator, and an air conditioner and the number of devices differ from an area network to an area network depending on preference of inhabitants, and it is extremely rare that the types of devices and the number of devices in one area network completely match those of another area network. Accordingly, information concerning a group of devices included in an area network can be used as the area network information.

Specifically, if a device successfully establishes a connection to (is successfully authenticated by) a controller, the device obtains information regarding other devices connected to the controller from the controller. Here, the information regarding other devices may be device IDs of the other devices. As described in the exemplary embodiment above, the controller holds the device information 800 as information concerning devices that have been successfully authenticated. Thus, all device IDs registered in the device information 800 are used as the device IDs to be transmitted to the device as the information regarding other devices included in the area network. In the correspondence information held by the manufacturer server 300, the information regarding other devices included in the area network to which the device belongs is further associated.

Accordingly, in the case where information regarding devices included in an area network is used as the area network information, the device holds the area network information illustrated in FIG. 17, for example. Specifically, controller information 1700 held by the device in this case includes a controller ID field 1701, a certificate ID field 1702, and an other device ID field 1703 associated with one another. The controller ID field 1701 contains an ID of a controller for which authentication for connection is successful. The certificate ID field 1702 contains an ID of a public key certificate of the controller. The other device ID field 1703 contains IDs of individual devices belonging to the same area network. The device is requested to provide the area network information instead of the connected controller ID in step S1503 of FIG. 15 or 16 by the manufacturer server 300, and transmits information contained in the other device ID field 1703 of the controller information 1700.

The manufacturer server 300 holds the correspondence information illustrated in FIG. 18. Correspondence information 1800 illustrated in FIG. 18 is information in which a device ID field 1801, a controller ID field 1802, and an other device ID field 1803 are associated with one another.

Note that the correspondence information 1800 may be information in which device IDs of all devices connected to the controller are associated with the controller ID of the controller. In this case, the manufacturer server 300 searches all the device IDs for the device ID contained in the check request transmitted from the controller and determines whether or not the retrieved device ID matches any of the other device IDs obtained from the device. In this way, the manufacturer server 300 detects an unauthorized device.

In addition, in the case where information regarding a configuration of an area network is used as the area network information, information indicating types of devices (e.g., an air conditioner, a refrigerator, and a television) may be further associated in order to enhance the identify of the area network. An example of the controller information held by the device in this case is illustrated in FIG. 19. The controller information held by the device alone is illustrated here; however, the information indicating types of devices is also stored in the device information held by the controller and in the correspondence information held by the manufacturer server 300 in association, and is used as the area network information to detect an unauthorized device. In the case where controller information 1900 (which includes a controller ID 1901, a controller certificate ID 1902, a device type ID 1903, and a device ID 1904) illustrated in FIG. 19 is used, the manufacturer server 300 may specify one of the types of devices and the device may transmit a device ID of another device corresponding to the specified kind. In this case, the manufacturer server 300 no longer needs to perform comparison on IDs of all the other devices, and thus the processing time can be shortened and the processing load can be reduced.

In the case where information indicating a group of devices included in an area network is used as the area network information, a device for which authentication is newly performed may be determined to be an authorized device if a certain number (or a certain percentage) of IDs of other devices held by the device match IDs indicated by the correspondence information instead of all the IDs of the other devices in view of a possibility of the area network including many devices. In addition, in order to enhance the identity, operation history information of each device may be further associated.

(2) In the above-described exemplary embodiment, the device transmits a controller ID if it is requested to transmit the controller ID as the area network information by the manufacturer server 300; however, the device may transmit the controller ID before it is requested to transmit the controller ID by the manufacturer server 300.

Specifically, when the device transmits a connection request to the controller, the device transmits the device ID and the public key certificate held therein along with the connection request. In addition to these pieces of information, the device may further transmit the controller ID as the area network information held therein.

When the controller transmits a check request to the manufacturer server 300, the controller transmits the controller ID transmitted from the device as the area network information as well as the device ID and the controller ID thereof.

With this configuration, if the correspondence information includes the transmitted device ID, the manufacturer server 300 can determine whether or not the controller ID associated in the correspondence information with the device ID matches the controller ID that is held by the device and transmitted from the controller as the area network information by comparing them with each other.

Accordingly, this configuration can omit an operation for communication performed by the manufacturer server 300 to request the device to transmit the controller ID.

(3) In the above-described exemplary embodiment, the individual devices are connected to the network via the controller and update the CRL and software; however, the update may be performed not via the connected controller. That is, the individual devices may have a line connected to the network 500 not via the controller and may perform communication directly with other devices (e.g., the manufacturer server 300 and the portal server 400) via the network 500. Such a configuration enables the CRL to be updated even if the controller crashes due to some reason.

(4) In the above-described exemplary embodiment, when authentication between the device and the controller is successful, the manufacturer server 300 additionally registers the device ID and the controller ID in the correspondence information in association with each other; however, in the case where the device ID is already registered in the correspondence information, the already associated controller ID may be overwritten by the controller ID newly associated.

(5) In the above-described exemplary embodiment, the correspondence information is held by the manufacturer server 300; however, the correspondence information may be stored on an external storage medium made accessible to the manufacturer server 300 and the manufacturer server 300 may access the external storage medium and perform the authentication process.

(6) In the above-described exemplary embodiment, authentication using a public key certificate and a random number has been described; however, the authentication method is not limited to this particular method. Any other authentication method capable of verifying the authenticity of devices may be used. As the other authentication method, for example, authentication using common key encryption or password-based authentication may be used.

(7) Communication performed by the communication unit of each apparatus in the above-described exemplary embodiment may be wireless or wired as long as communication can be performed with the communication counterpart.

(8) In the above-described exemplary embodiment, deletion of an entry of a pair of the device ID and the certificate ID from the device information and deletion of an entry of a pair of the controller ID and the certificate ID from the controller information are not particularly mentioned. The deletion may be performed by the user of each apparatus when necessary or entries regarding a device and a controller that have not performed communication for a certain period of time (e.g., three months) may be deleted.

Note that it is desirable that the latest information on the controller ID and the corresponding certificate ID is not deleted from the device. In the case where the latest information on the controller ID and the certificate ID is deleted from the device, an entry of the device ID of the device and its associated controller ID is desirably deleted from the correspondence information held by the manufacturer server 300.

(9) In the above-described exemplary embodiment, encrypted communication (e.g., secure socket layer (SSL) communication) may be performed between the apparatuses (between the manufacturer server 300 and the portal server 400, between the device and the controller, and between the controller and the manufacturer server 300), which is not specially mentioned. This configuration can prevent information transmitted and received through communication between the apparatuses from being obtained and misused by a third party.

(10) In the above-described exemplary embodiment, the description has been given on the assumption that a public key certificate has already been issued to each of the controllers and devices. The portal server 400 may serve as a certificate authority and further have a function for issuing a public key certificate, which has not been specially mentioned.

(11) In the above-described exemplary embodiment, a home area network has been described as an example of an area network; however, the area network need not be a home area network as long as the area network is a closed local network. For example, the area network may be a network to which a controller and a plurality of devices in a structure (e.g., a building) belong or a network to which a controller and a plurality of devices in a certain area (e.g., an area of some kind of facility) belong. That is, the area network used in the exemplary embodiment of the present disclosure is not limited to a home.

(12) In the above-described exemplary embodiment, the manufacturer server 300 transmits a connected controller ID request to a device that has transmitted a connection request so as to obtain the controller ID that is held by the device and serves as the area network information. This is a configuration necessary for the manufacturer server 300 to detect an unauthorized device by comparing the obtained controller ID with the correspondence information. Instead of this configuration, the following method may be used.

Specifically, upon receipt of a check request from the controller, the manufacturer server 300 determines whether or not the device ID contained in the check request is registered in the correspondence information. If the device ID is registered, the manufacturer server 300 identifies the controller associated with the device ID in the correspondence information. The manufacturer server 300 then transmits the device ID contained in the check request to the identified controller so as to make an inquiry as to whether the device ID is contained in the device information held by the identified controller. If the device ID is held by the identified controller, the device is determined to be an authorized device; if the device ID is not held by the identified controller, the device is determined to be an unauthorized device.

An unauthorized device can also be detected by using such a method.

(13) The above-described exemplary embodiment and each of the modifications can be appropriately combined with each other.

(14) The communication, the operations related to the authentication process, and the unauthorized device detection process described in the exemplary embodiment above may be implemented as a result of a processor mounted in each apparatus executing program code for executing the processes.

In addition, a control program including program code causing a processor of the manufacturer server 300 or the like and various circuits connected to the processor to execute the communication, the operations related to the authentication process, and the unauthorized device detection process (see FIG. 14) described in the exemplary embodiment above may be distributed by recording the control program on a recording medium or via various communication channels or the like. Examples of the recording medium include an integrated circuit (IC) card, a hard disk, an optical disc, a flexible disk, and a read only memory (ROM). The distributed control program is utilized by being stored in a memory or the like from which the control program can be read out by the processor and the processor executes the control program. In this way, various functions described in the exemplary embodiment are implemented.

(15) Individual functional units of each of the apparatuses (the device, the controller, the manufacturer server, and the portal server) included in the unauthorized device detection system described in the exemplary embodiment above may be implemented as a circuit that executes the functions or may be implemented as a result of one or a plurality of processors executing the program.

Alternatively, the individual functional units of each of the apparatuses described in the exemplary embodiment above may be configured as an IC, a large scale integration (LSI), or another type of IC package. This package is mounted in each apparatus and is utilized. In this way, each apparatus implements the functions described in the exemplary embodiment.

The functional blocks are typically implemented as an LSI, which is an integrated circuit. Each of the functional blocks may be implemented as separate chips, or some or all of the functional blocks may be implemented as a single chip. Although the term "LSI" is used here, other terms including "IC", "system LSI", "super LSI", and "ultra LSI" may be used depending on the degree of integration. In addition, the circuit integration technique is not limited to LSI, and circuit integration may be implemented using a dedicated circuit or general-purpose processor. A field programmable gate array (FPGA) that is programmable after manufacturing of an LSI or a reconfigurable processor in which connections and settings of circuit cells within the LSI are reconfigurable may be used.

Supplementary Notes

An unauthorized device detection method according to aspects of the present disclosure and benefits provided thereby will be described.

(a) An aspect of the present disclosure provides an unauthorized device detection method employed in an unauthorized device detection system, the unauthorized device detection system including a plurality of area networks (home area networks a and b) and an unauthorized device detection server (300), each of the plurality of area networks including at least one controller (100a, 100b) and one or more devices (200a, 200b, 200c, 200d, 200e) connected to the controller, the unauthorized device detection server holding correspondence information (600) in which, for each of the plurality of area networks, area network information concerning the area network is associated with one or more device identifiers indicating one or more devices for which an authentication process has been successful among the one or more devices included in the area network, the unauthorized device detection method including: causing, in a case where an authentication process performed between a device among the one or more devices and the controller is successful, the device to hold the area network information (700) concerning the area network including the controller for which the authentication process is successful; causing, in a case where there is a device for which authentication is newly performed between the device and a controller among the controllers, the unauthorized device detection server to obtain a device identifier of the device for which authentication is newly performed (step S1401); causing the unauthorized device detection server to check whether or not the device identifier that has been obtained is contained in the correspondence information (step S1402); causing the unauthorized device detection server to attempt to obtain the area network information from the device for which authentication is newly performed (step S1404), in a case where the device identifier that has been obtained is contained in the correspondence information (YES in step S1402); causing, in a case where the area network information has been successfully obtained from the device for which authentication is newly performed (step S1405), the unauthorized device detection server to determine whether or not the area network information that has been obtained matches the area network information associated in the correspondence information with the device identifier of the device for which authentication is newly performed (step S1406); and causing the unauthorized device detection server to detect the device for which authentication is newly performed as an unauthorized device, in a case where it is determined that the area network information that has been obtained does not match the area network information associated in the correspondence information with the device identifier of the device for which authentication is newly performed (NO in step S1406).

Another aspect of the present disclosure provides an unauthorized device detection server (300) included in an unauthorized device detection system, the unauthorized device detection system including the unauthorized device detection server and a plurality of area networks (home area networks a and b), each of the plurality of area networks including at least one controller (100a, 100b) and one or more devices (200a, 200b, 200c, 200d, 200e) each connected to the controller and holding area network information concerning the area network including the controller, the unauthorized device detection server including: a correspondence information memory (340) that stores, in a case where an authentication process performed between a device among the one or more devices and the controller is successful, a device identifier of the device and the area network information concerning the area network including the controller in association with each other; a device identifier obtainer (320) that obtains, in a case where there is a device for which authentication is newly performed between the device and a controller among the controllers, a device identifier of the device for which authentication is newly performed; a registration checker (320) that checks whether or not the device identifier that has been obtained is stored in the correspondence information memory; an area network information obtainer (320) that attempts to obtain the area network information from the device for which authentication is newly performed, in a case where the device identifier that has been obtained is stored in the correspondence information memory; a determiner (320) that determines, in a case where the area network information has been successfully obtained by the area network information obtainer from the device for which authentication is newly performed, whether or not the area network information that has been obtained matches the area network information stored in the correspondence information memory in association with the device identifier of the device for which authentication is newly performed; and an unauthorized device detector (320) that detects the device for which authentication is newly performed as an unauthorized device in a case where it is determined that the area network information that has been obtained does not match the area network information stored in the correspondence information memory in association with the device identifier of the device for which authentication is newly performed.

Another aspect of the present disclosure provides an unauthorized device detection system including a plurality of area networks and an unauthorized device detection server, each of the plurality of area networks including at least one controller and one or more devices each connected to the controller and holding area network information concerning the area network including the controller, the unauthorized device detection system including: a correspondence information memory that stores, in a case where an authentication process performed between a device among the one or more devices and the controller is successful, a device identifier of the device and the area network information concerning the area network including the controller in association with each other; a device identifier obtainer that obtains, in a case where there is a device for which authentication is newly performed between the device and a controller among the controllers, a device identifier of the device for which authentication is newly performed; a registration checker that checks whether or not the device identifier that has been obtained is stored in the correspondence information memory; an area network information obtainer that attempts to obtain the area network information from the device for which authentication is newly performed, in a case where the device identifier that has been obtained is stored in the correspondence information memory; a determiner that determines, in a case where the area network information has been successfully obtained by the area network information obtainer from the device for which authentication is newly performed, whether or not the area network information that has been obtained matches the area network information stored in the correspondence information memory in association with the device identifier of the device for which authentication is newly performed; and an unauthorized device detector that detects the device for which authentication is newly performed as an unauthorized device in a case where it is determined that the area network information that has been obtained does not match the area network information stored in the correspondence information memory in association with the device identifier of the device for which authentication is newly performed.

In the case where a device identifier of a device for which authentication is newly performed is already registered in the correspondence information, it means that an authentication process has been performed between the device and another controller before. Accordingly, if the device does not hold area network information that matches area network information associated in the correspondence information, the device can be detected as an unauthorized device. Consequently, an unauthorized device can be prevented from joining a network.

If authentication performed between the device and the controller is successful, the device generally stores and holds information concerning the controller serving as the communication destination. When this information concerning the controller is used as the area network information, a situation in which lots of information stored for authentication occupies the storage capacity of the device can be avoided.

(b) The unauthorized device detection method according to (a) may further include: causing the unauthorized device detection server to detect the device for which authentication is newly performed as an unauthorized device, in a case where the area network information is not successfully obtained from the device for which authentication is newly performed.

In the case where a device having a device identifier that is already registered in the unauthorized device detection server attempts to perform authentication, the device is supposed to have been authenticated by any of the controllers before and is supposed to hold the area network information. Accordingly, in the case where the device does not hold the area network information, the device that attempts to perform authentication can be detected as an unauthorized device with this configuration.

(c) In the unauthorized device detection method according to (a), the area network information concerning an area network may be an identifier uniquely assigned to the controller included in the area network.

With this configuration, the identifier of the controller can be used as information identifying the area network. Because each area network includes at least one controller, the identifier of the controller can be used as the information identifying the area network.

(d) In the unauthorized device detection method according to (a), the area network information concerning an area network may be a media access control address of the controller included in the area network.

With this configuration, the MAC address of the controller can be used as the information identifying the area network. Because each area network includes at least one controller and a MAC address of the controller is uniquely assigned to the controller in the network, the MAC address can be used as information identifying the area network.

(e) In the unauthorized device detection method according to (a), the area network information concerning an area network may be area network identification information uniquely predetermined for the area network.

With this configuration, area network identification information uniquely assigned to each area network can be used as the information identifying the area network. The use of the identification information uniquely assigned to each area network can allow, for example, an administrator of the system or the like to recognize the corresponding area network more easily.

(f) In the unauthorized device detection method according to (a), the area network information concerning an area network may be device information which includes one or more device identifiers of the one or more devices included in the area network.

With this configuration, information indicating a group of devices included in the area network can be used as information identifying the area network. Because it is expected that each area network includes various devices and the configuration of the devices is likely to be unique to each area network, the information indicating the group of the devices can be used as the information identifying the area network.

(g) The unauthorized device detection method according to (a) may further include: causing the unauthorized device detection server to register the device identifier of the device for which authentication is newly performed and the area network information concerning an area network that includes the controller connected to the device for which authentication is newly performed in association with each other, in a case where the device identifier of the device for which authentication is newly performed is contained in the correspondence information and it is determined that the area network information that has been obtained from the device for which authentication is newly performed matches the area network information associated in the correspondence information with the device identifier of the device for which authentication is newly performed.

With this configuration, in the case where the device newly subjected to authentication holds area network information and the held area network information matches area network information associated with the device in the correspondence information, the device can be detected as an authorized device that has performed an authentication process with another controller before.

An unauthorized device detection method according to an aspect of the present disclosure can be used, for example, in control of devices included in a home network system in order to detect an unauthorized device newly connected to the home network system.

What is claimed is:

1. An unauthorized device detection method, without storing additional information at a first device, the method comprising:

in a case where a first authentication process performed between a first device and a first controller is successful, a server storing correspondence information in which first home area network information identifying a first home area network is associated with a first device identifier identifying the first device, the first home area network including the first controller;

in a case where the first authentication process is successful, the first device storing the first home area network information identifying the first home area network;

in a case where there is a second device for which a second authentication process is newly performed between the second device and a second controller, the server obtaining a second device identifier of the second device;

the server checking whether the obtained second device identifier is the same as the first device identifier contained in the correspondence information;

the server attempting to obtain second home area network information from the second device, in a case where the obtained second device identifier is the same as the first device identifier contained in the correspondence information;

in a case where the second home area network information has been successfully obtained from the second device, the server determining whether the obtained second home area network information matches the first home area network information associated in the correspondence information with the first device identifier; and the server detecting the second device as an illegitimate device, in a case where (i) the obtained second identifier is the same as the first device identifier contained in the correspondence information, and (ii) it is determined that the obtained second home area network information does not match the first home area network information associated in the correspondence information with the first device identifier.

2. The method according to claim 1, further comprising:
causing the server to detect the second device for which the second authentication process is newly performed as an illegitimate device, in a case where the second home area network information is not successfully obtained from the second device for which authentication is newly performed.

3. The method according to claim 1,
wherein the first home area network information identifying the first home area network is an identifier uniquely assigned to the first controller included in the first home area network.

4. The method according to claim 1,
wherein the first home area network information identifying the first home area network is a media access control address of the first controller included in the first home area network.

5. The method according to claim 1,
wherein the first home area network information identifying the first home area network is the first home area network identification information uniquely predetermined for the first home area network.

6. The method according to claim 1,
wherein the first home area network information identifying the first home area network is device information which includes one or more device identifiers of one or more devices included in the first home area network.

7. The method according to claim 1, further comprising:
in a case where the second device identifier of the second device for which authentication is newly performed is contained in the correspondence information, and it is determined that the obtained second home area network information that has been obtained from the second device for which authentication is newly performed matches the first home area network information associated in the correspondence information with the obtained second device identifier of the second device for which authentication is newly performed, causing the server to register the obtained second device identifier of the second device for which authentication is newly performed and third home area network information identifying a third home area network that includes the second controller connected to the second device for which authentication is newly performed in association with each other.

8. A server for unauthorized device detection, without storing addition information at a first device, comprising:

a correspondence information memory that stores, in a case where a first authentication process performed between a device and a first controller is successful, a first device identifier of the first device and first home area network information identifying a first home area network including the first controller in association with each other;

a device identifier obtainer that obtains, in a case where there is a second device for which authentication is newly performed between the second device and a second controller, a second device identifier of the second device for which authentication is newly performed;

a registration checker that checks whether or not the second device identifier that has been obtained is the same as the first device identifier stored in the correspondence information memory;

an area network information obtainer that attempts to obtain the second home area network information from the second device for which authentication is newly performed, in a case where the obtained second device identifier is the same as the first device identifier stored in the correspondence information memory;

a determiner that determines, in a case where the second home area network information has been successfully obtained by the area network information obtainer from the second device for which authentication is newly performed, whether or not the obtained second home area network information matches the first home area network information stored in the correspondence information memory in association with the first device identifier of the second device for which authentication is newly performed; and an unauthorized device detector that detects the second device for which authentication is newly performed as an illegitimate device in a case where (i) the obtained second identifier is the same as the first device identifier contained in the correspondence information, and (ii) it is determined that the obtained second home area network information does not match the first home area network information stored in the correspondence information memory in association with the first device identifier of the device for which authentication is newly performed.

9. A system for unauthorized device detection, without storing addition information at a first device, comprising:
   a correspondence information memory that stores, in a case where a first authentication process performed between a device and a first controller is successful, a first device identifier of the first device and first home area network information identifying a first home area network including the first controller in association with each other;
   a device identifier obtainer that obtains, in a case where there is a second device for which authentication is newly performed between the second device and a second controller, a second device identifier of the second device for which authentication is newly performed;
   a registration checker that checks whether or not the second device identifier that has been obtained is the same as the first device identifier stored in the correspondence information memory;
   an area network information obtainer that attempts to obtain the second home area network information from the second device for which authentication is newly performed, in a case where the obtained second device identifier is the same as the first device identifier stored in the correspondence information memory;
   a determiner that determines, in a case where the second home area network information has been successfully obtained by the area network information obtainer from the second device for which authentication is newly performed, whether or not the obtained second home area network information matches the first home area network information stored in the correspondence information memory in association with the first device identifier of the second device for which authentication is newly performed; and
   an unauthorized device detector that detects the second device for which authentication is newly performed as an illegitimate device in a case where (i) the obtained second identifier is the same as the first device identifier contained in the correspondence information, and (ii) it is determined that the obtained second home area network information does not match the first home area network information stored in the correspondence information memory in association with the first device identifier of the device for which authentication is newly performed.

* * * * *